US012632075B2

(12) United States Patent
Lee et al.

(10) Patent No.: US 12,632,075 B2
(45) Date of Patent: May 19, 2026

(54) DIGITAL LDO REGULATOR AND METHOD OF OPERATING THE SAME

(71) Applicant: SAMSUNG ELECTRONICS CO., LTD., Suwon-si (KR)

(72) Inventors: Dongha Lee, Suwon-si (KR); Seki Kim, Suwon-si (KR); Takahiro Nomiyama, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 18/635,835

(22) Filed: Apr. 15, 2024

(65) Prior Publication Data

US 2024/0393817 A1 Nov. 28, 2024

(30) Foreign Application Priority Data

May 22, 2023 (KR) ......................... 10-2023-0065692
Aug. 10, 2023 (KR) ......................... 10-2023-0104841

(51) Int. Cl.
*G05F 1/59* (2006.01)
*G06F 1/26* (2006.01)

(52) U.S. Cl.
CPC . *G05F 1/59* (2013.01); *G06F 1/26* (2013.01)

(58) Field of Classification Search
CPC .............. G05F 1/59; G05F 1/575; G06F 1/26
See application file for complete search history.

(56) References Cited

U.S. PATENT DOCUMENTS

| | | | |
|---|---|---|---|
| 9,946,281 B1 * | 4/2018 | Huang | .................... G05F 1/565 |
| 10,635,124 B2 | 4/2020 | Mahajan et al. | |
| 10,739,729 B2 | 8/2020 | Mahajan et al. | |
| 11,614,761 B2 | 3/2023 | Lee | |
| 2005/0040800 A1 * | 2/2005 | Sutardja | ................ H02M 3/157 |
| | | | 323/283 |
| 2021/0026384 A1 | 1/2021 | Jin | |
| 2021/0247789 A1 * | 8/2021 | Chang | ................. G11C 11/1697 |
| 2022/0404853 A1 | 12/2022 | Kim et al. | |
| 2024/0393817 A1 * | 11/2024 | Lee | .......................... G05F 1/575 |

FOREIGN PATENT DOCUMENTS

| | | |
|---|---|---|
| CN | 111208858 A | 5/2020 |
| KR | 10-1408201 B1 | 6/2014 |
| KR | 10-2017-0084809 A | 7/2017 |
| KR | 10-2020-0006749 A | 1/2020 |
| KR | 10-2022-0131063 A | 9/2022 |

* cited by examiner

*Primary Examiner* — Kyle J Moody

(74) *Attorney, Agent, or Firm* — Sughrue Mion, PLLC

(57) ABSTRACT

A digital low-dropout (LDO) regulator may include: an LDO core configured to select a control mode based on a state of an output voltage of the digital LDO regulator provided to a load block and to output a control code based on the control mode; and a plurality of power transistors configured to control supply current supplied to the load block based on the control code. The control mode may include a first mode and a second mode for changing the supply current faster than in the first mode. The LDO core may be configured to perform a step-back operation to re-output a previous control code output at least one cycle ago and operate in the first mode based on the state of the output voltage corresponding to the first mode being detected while operating in the second mode.

20 Claims, 21 Drawing Sheets

Figure 14:
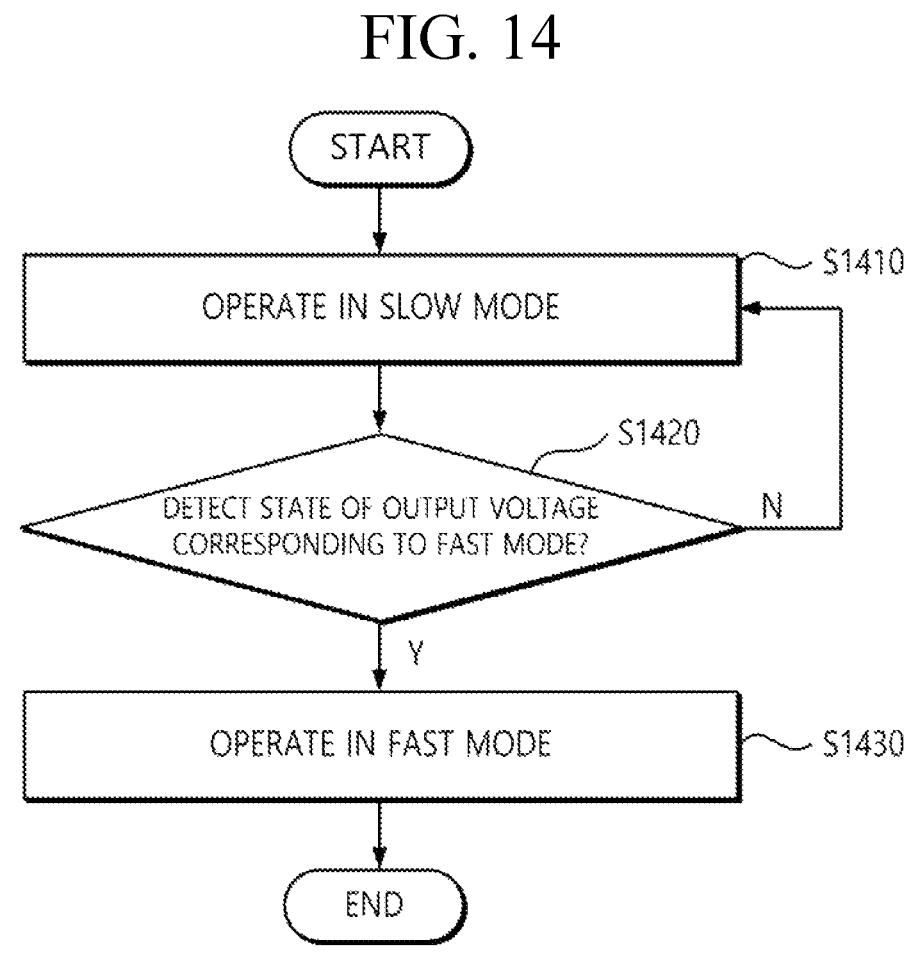

```
          ┌─────────────┐
          │    START    │
          └─────────────┘
                 │
                 ▼
┌───────────────────────────────────────┐  ⌇ S1410
│         OPERATE IN SLOW MODE           │◀─┐
└───────────────────────────────────────┘  │
                 │                          │
                 ▼           ⌇ S1420        │
         ╱───────────────────╲             │
        ╱   DETECT STATE OF    ╲      N     │
       ◁  OUTPUT VOLTAGE        ▷───────────┘
        ╲ CORRESPONDING TO     ╱
         ╲   FAST MODE?       ╱
          ╲─────────────────╱
                 │ Y
                 ▼
┌───────────────────────────────────────┐  ⌇ S1430
│          OPERATE IN FAST MODE          │
└───────────────────────────────────────┘
                 │
                 ▼
          ┌─────────────┐
          │     END     │
          └─────────────┘
```

FIG. 15

DIGITAL LDO REGULATOR AND METHOD OF OPERATING THE SAME

CROSS-REFERENCE TO RELATED APPLICATION(S)

This U.S. application claims priority under 35 USC § 119 to Korean Patent Application Nos. 10-2023-0065692, filed on May 22, 2023 and 10-2023-0104841, filed on Aug. 10, 2023, in the Korean Intellectual Property Office, the disclosures of which are herein incorporated by reference in their entirety.

BACKGROUND

1. Field

Example embodiments relate to a digital low-dropout (LDO) regulator and a method of operating the same.

2. Description of Related Art

As the number of functions included in a system-on-chip (SoC) increases, the need for a larger number of power routings between a power management integrated circuit (PMIC) and the SoC has arisen. However, this causes an increase in area and price of a printed circuit board (PCB).

A method of merging power supplies of intellectual property (IP) blocks within an SoC has been proposed to decrease the number of power routings. In this case, the IP blocks within the SoC receive a single merged power supply from a PMIC, resulting in increased power consumption in comparison to supplying different voltages for each IP block as necessary.

Accordingly, a technology for embedding an LDO regulator in an SoC has been developed to supply a voltage required for each component while decreasing the number of power routings. In this case, a digital LDO regulator, which may be implemented in a small size without a capacitor and may operate at low voltage, is more appropriate to be embedded in the SoC than an analog LDO regulator.

SUMMARY

Example embodiments provide a digital low-dropout (LDO) regulator, capable of stably supplying a voltage using header cell switches in a system-on-chip (SoC), and a method of operating the digital LDO regulator.

According to an aspect of an example embodiment, a digital low-dropout (LDO) regulator may include: an LDO core configured to select a control mode based on a state of an output voltage of the digital LDO regulator provided to a load block and to output a control code based on the control mode; and a plurality of power transistors configured to control supply current supplied to the load block based on the control code. The control mode may include a first mode and a second mode for changing the supply current faster than in the first mode. The digital LDO regulator may be configured for the control code to be changed stepwise for each cycle. The LDO core may be configured to perform a step-back operation to re-output a previous control code output at least one cycle ago and operate in the first mode based on the state of the output voltage corresponding to the first mode being detected while operating in the second mode.

The load block may include a core of a processor in a system-on-chip (SoC). The plurality of power transistors may be at least a portion of header cell switches corresponding to the core of the processor, among header cell switches in the SoC.

A delay time it takes to detect the state of the output voltage, changed based on the control code and after the control code may be output in the LDO core, may be N cycles. The LDO core may be configured to perform the N cycles of the step-back operation to re-output the previous control code output the N cycles ago based on the state of the output voltage corresponding to the first mode being detected while operating in the second mode.

The LDO core may be configured to increase an amount of change per cycle of the control code in the second mode compared with the first mode, or increase an operating frequency in the second mode compared with the first mode.

The LDO core may be configured to operate in the second mode based on the state of the output voltage corresponding to the second mode being detected while operating in the first mode.

The LDO core may be configured to perform the step-back operation and a negative step operation in the first mode for a predetermined time, based on the state of the output voltage corresponding to the first mode being detected while operating in the second mode. The negative step operation may be outputting an opposite control code changed in an opposite direction to a direction in which the control code, output while operating in the second mode, may be changed.

The LDO core may be configured to perform the negative step operation for a predetermined number of cycles, a number of cycles corresponding to an amount of change in the control code caused by the step-back operation, or until the output voltage reaches a target voltage.

The LDO core may include: a comparator configured to compare the output voltage and a target voltage and to generate a comparison result signal; a detection circuit configured to detect at least one of whether the output voltage exceeds a threshold voltage and a direction in which the output voltage may be changed and to generate a detection result signal; and a controller configured to: detect the state of the output voltage based on the comparison result signal and the detection result signal, to select the control mode based on the state of the output voltage, and to output the control code based on the control mode; and perform the step-back operation and the negative step operation in the first mode for the predetermined time, based on the state of the output voltage corresponding to the first mode being detected while operating in the second mode.

The detection circuit may be configured to detect whether the output voltage may be lower than a first threshold voltage lower than the target voltage and whether the output voltage exceeds a second threshold voltage higher than the target voltage. The controller may be configured to: select the second mode based on the output voltage being lower than the first threshold voltage in an undershoot period in which the output voltage may be lower than the target voltage, or based on the output voltage exceeding the second threshold voltage in an overshoot period in which the output voltage may be higher than the target voltage; and select the first mode based on the output voltage being greater than or equal to the first threshold voltage in the undershoot period, or based on the output voltage being less than or equal to the second threshold voltage in the overshoot period.

The controller may be configured to perform the step-back operation and the negative step operation in the first mode for the predetermined time, based on the output voltage being greater than or equal to the first threshold voltage while operating in the second mode in the undershoot period or the output voltage being less than or equal to the second threshold voltage while operating in the second mode in the overshoot period.

The detection circuit may be configured to detect whether the output voltage increases or decreases. The controller may be configured to: select the second mode based on the output voltage decreasing in an undershoot period in which the output voltage is lower than the target voltage or the output voltage increasing in an overshoot period in which the output voltage is higher than the target voltage, and select the first mode based on the output voltage increasing in the undershoot period or the output voltage decreasing in the overshoot period.

The controller may be configured to perform the step-back operation and the negative step operation in the first mode for the predetermined time, based on the output voltage increasing while operating in the second mode in the undershoot period or the output voltage decreasing while operating in the second mode in the overshoot period.

The detection circuit may be configured to detect whether the output voltage may be lower than a first threshold voltage lower than the target voltage, whether the output voltage exceeds a second threshold voltage higher than the target voltage, and whether the output voltage increases or decreases. The controller may be configured to: select the second mode based on the output voltage being lower than the first threshold voltage and decreasing in an undershoot period in which the output voltage is lower than the target voltage, or based on the output voltage exceeding the second threshold voltage and increasing in an overshoot period in which the output voltage is higher than the target voltage, and select the first mode based on the output voltage being greater than or equal to the first threshold voltage or being lower than the first threshold voltage and increasing in the undershoot period, or based on the output voltage being less than or equal to the second threshold voltage or exceeding the second threshold voltage and decreasing in the overshoot period.

The controller may be configured to perform the step-back operation and the negative step operation in the first mode for the predetermined time, based on the output voltage increasing while operating in the second mode in the undershoot period, or based on the output voltage decreasing while operating in the second mode in the overshoot period.

According to an aspect of an example embodiment, a method of operating a digital low-dropout (LDO) regulator, the method may include: detecting a state of an output voltage provided to a load block; and adjusting supply current, provided toe the load block, based on the state of the output voltage. The state of the output voltage may include a first state corresponding to a first mode and a second state corresponding to a second mode for changing the supply current faster than the first mode. The supply current may be adjusted stepwise for each cycle. The adjusting the supply current may include: performing a step-back operation to re-output the supply current output at least one cycle ago based on the first state being detected while adjusting the supply current in the second mode based on the second state; and adjusting the supply current in the first mode.

The load block may include a core of a processor in a system-on-chip (SoC). The adjusting the supply current may include controlling turn-on and turn-off operations of at least a portion of header cell switches corresponding to the core of the processor, among header cell switches in the SoC.

The adjusting the supply current may include adjusting the supply current in the second mode based on the second state being detected while adjusting the supply current in the first mode based on the first state.

The adjusting the supply current in the first mode may include performing a negative step operation in the first mode for a predetermined time. The negative step operation may be adjusting the supply current in an opposite direction to a direction in which the supply current may be adjusted in the second mode.

According to an aspect of an example embodiment, a system-on-chip (SoC) may include: a processing core; a plurality of header cell switches configured to supply a driving voltage to the processing core; and a low-dropout (LDO) core configured to select a control mode based on a state of the driving voltage supplied to the processing core and to output a control code for controlling operations of the plurality of header cell switches based on the control mode for each cycle. The plurality of header cell switches may be configured to control an amount of supply current, supplied to the processing core, based on the control code to adjust the driving voltage. The LDO core may be configured to perform a step-back operation to re-output a previous control code, output in a previous cycle, based on the state of the driving voltage corresponding to a slow mode being detected while operating in a fast mode for adjusting the driving voltage faster than in the slow mode.

The LDO core may be configured to perform the step-back operation and a negative step operation in the slow mode for a predetermined time based on the state of the driving voltage corresponding to the slow mode being detected while operating in the fast mode. The negative step operation may be outputting an opposite control code changed in an opposite direction to a direction in which the control code, output while operating in the fast mode, is changed.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 is a conceptual diagram illustrating a configuration of an SoC according to an example embodiment.

FIG. 5 is a diagram illustrating a finite state machine (FSM) related to the operation of a controller according to an example embodiment.

FIG. 9A is a diagram illustrating a configuration of a digital LDO regulator according to an example embodiment.

FIG. 14 is a diagram illustrating a method of operating a digital LDO regulator according to an example embodiment.

FIG. 15 is a block diagram illustrating a configuration of an electronic device according to an example embodiment.

DETAILED DESCRIPTION

Hereinafter, example embodiments will be described with reference to the accompanying drawings.

The expression "a first," "a second," "the first," or "the second" used in various embodiments of the disclosure modifies various components regardless of the order or the importance but does not limit the corresponding components.

Figure 1A:
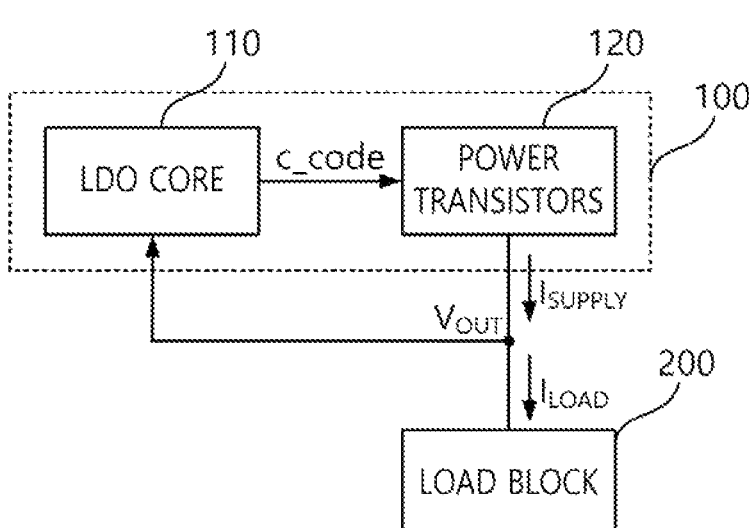
FIG. 1A is a schematic block diagram illustrating a configuration of a system-on-chip (SoC) according to an example embodiment.

FIG. 1A is a schematic block diagram illustrating a configuration of a system-on-chip (SoC) according to an example embodiment.

Referring to FIG. 1A, an SoC 1000 may include a digital low-dropout (LDO) regulator 100 and a load block 200. The load block 200 may be a single intellectual property (IP), among at least one IP included in the SoC 1000. For example, the SoC 1000 may include cores of various processing units such as a central processing unit (CPU), a graphics processing unit (GPU), or a neural processing unit (NPU), and the load block 200 may be a single core, among cores of such a processing unit. However, example embodiments are not limited thereto.

The digital LDO regulator 100 may provide an output voltage $V_{OUT}$ to the load block 200. The load block 200 may operate based on the output voltage $V_{OUT}$. In some cases, the output voltage $V_{OUT}$ may be referred to as a driving voltage.

Droop may occur in the output voltage $V_{OUT}$ depending on a change in load current $I_{LOAD}$. In this case, the digital LDO regulator 100 may adjust the output voltage $V_{OUT}$ such that the drooped output voltage $V_{OUT}$ converges to a target voltage. For example, when the load current $I_{LOAD}$ used by the load block 200 is greater than supply current $I_{SUPPLY}$ supplied by the digital LDO regulator 100 while the output voltage $V_{OUT}$ converges to the target voltage, the output voltage $V_{OUT}$ may be lower than the target voltage. In this case, the digital LDO regulator 100 may increase the supply current $I_{SUPPLY}$ such that the output voltage $V_{OUT}$ increases toward the target voltage. In contrast, when the load current $I_{LOAD}$ is smaller than the supply current $I_{SUPPLY}$ while the output voltage $V_{OUT}$ converges to the target voltage, the output voltage $V_{OUT}$ may be higher than the target voltage. In this case, the digital LDO regulator 100 may decrease the supply current $I_{SUPPLY}$ such that the output voltage $V_{OUT}$ decreases toward the target voltage.

For example, referring to FIG. 1A, the digital LDO regulator 100 may include an LDO core 110 and a plurality of power transistors 120.

The LDO core 110 may detect a state of the output voltage $V_{OUT}$ provided to the load block 200, and may generate a control code c_code based on the detected state of the output voltage $V_{OUT}$. In this case, the control code c_code may include a plurality of bits for controlling turn-on and turn-off operations of the plurality of power transistors 120. The LDO core 110 may output the generated control code c_code to the plurality of power transistors 120.

The plurality of power transistors 120 may adjust the supply current $I_{SUPPLY}$, provided to the load block 200, based on the control code c_code. For example, the plurality of power transistors 120 may be configured to turn on a larger number of power transistors as a value of the control code c_code increases. In addition, the plurality of power transistors 120 may be configured to generate more supply current $I_{SUPPLY}$ as a larger number of power transistors are turned on. Accordingly, the supply current $I_{SUPPLY}$ may be adjusted based on the value of the control code c_code.

According to an example embodiment, the LDO core 110 may increase and output the value of the control code c_code stepwise for each cycle in a period in which the output voltage $V_{OUT}$ is lower than the target voltage (hereinafter referred to as an "undershoot period"). In this case, the supply current $I_{SUPPLY}$ generated by the plurality of power transistors 120 may also increase stepwise for each cycle. The output voltage $V_{OUT}$ may increase toward the target voltage from a time point at which the supply current $I_{SUPPLY}$ is greater than the load current $I_{LOAD}$.

The LDO core 110 may decrease and output the value of the control code c_code stepwise for each cycle in a period in which the output voltage $V_{OUT}$ is higher than the target voltage (hereinafter referred to as an "overshoot period"). In this case, the supply current $I_{SUPPLY}$ generated by the plurality of power transistors 120 may also decrease stepwise for each cycle. The output voltage $V_{OUT}$ may decrease toward the target voltage from a time point at which the supply current $I_{SUPPLY}$ is smaller than the load current $I_{LOAD}$.

According to an example embodiment, the digital LDO regulator 100 may adjust the output voltage $V_{OUT}$ at different speeds depending on the state of the output voltage $V_{OUT}$. To this end, the LDO core 110 may select a control mode based on the state of the output voltage $V_{OUT}$ and then output a control code c_code based on the selected control mode.

In an example embodiment, the control mode may include a slow mode and a fast mode. In the fast mode, the digital LDO regulator 100 may change the supply current $I_{SUPPLY}$ faster than in the slow mode. Accordingly, the output voltage $V_{OUT}$ may be adjusted faster in the fast mode than in the slow mode.

In an example embodiment, the LDO core 110 may select the fast mode or the slow mode based on at least one of whether the output voltage $V_{OUT}$ exceeds a predetermined threshold voltage and a direction in which the output voltage $V_{OUT}$ is changed. This will be described in detail later.

In an example embodiment, the LDO core 110 may increase the amount of change per cycle of the control code c_code in the fast mode compared with the slow mode. For example, when the control code c_code is a 10-bit control code, the LDO core 110 may change and output the value of the control code c_code by 1 for each cycle in the slow mode. On the other hand, the LDO core 110 may change the value of the control code c_code by 4 for each cycle and the output the changed value in the fast mode. Alternatively, the LDO core 110 may double and output the amount of change in the control code c_code for each cycle in the fast mode. Accordingly, the supply current $I_{SUPPLY}$ may be changed faster in the fast mode than in the slow mode.

In an example embodiment, the LDO core 110 may increase an operating frequency in the fast mode compared with the slow mode. For example, the LDO core 110 may change and output the value of the control code c_code every first cycle corresponding to a first operating frequency in the slow mode. On the other hand, the LDO core 110 may change the value of the control code c_code every second cycle corresponding to a second operating frequency, higher than the first operating frequency, and the output the changed value in the fast mode. Accordingly, the supply current $I_{SUPPLY}$ may change faster in the fast mode than in the slow mode.

Figure 1B:
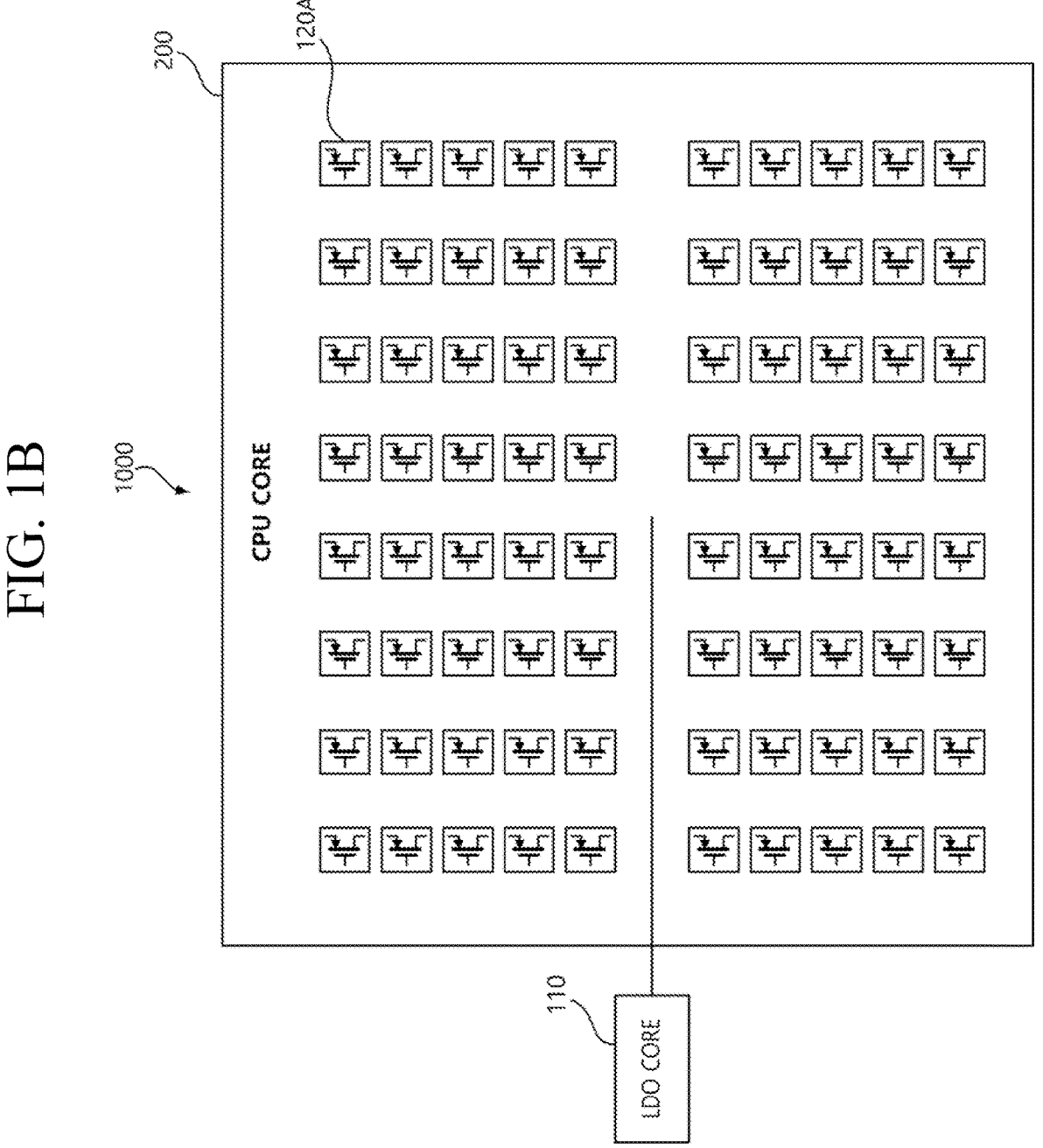
FIG. 1B is a conceptual diagram illustrating an example of how to implement the SoC of FIG. 1A.

FIG. 1B is a conceptual diagram illustrating an example of how to implement the SoC of FIG. 1A. Hereinafter, a configuration and an operation of a digital LDO regulator according to an example embodiment will be described with reference to FIGS. 1A and 1B. Referring to FIG. 1B, the SoC 1000 may include an LDO core 110 and a load block 200. In FIG. 1B, an example will be provided in which the load block 200 is a CPU core.

The SoC 1000 may include header cell switches 120A corresponding to the CPU core 200. The header cell switches 120A may be power transistors for power gating of the CPU core 200. The term "power gating" refers to a technique for reducing power consumption by cutting off power supplied to the CPU core 200 for a period in which the CPU core 200 is not operating.

All logic cells included in the CPU core 200 may be supplied with power through the header cell switches 120A. To this end, the SoC 1000 may include a larger number of numerous header cell switches 120A distributed widely in a region corresponding to the CPU core 200, as illustrated in FIG. 1B. In a general case, all of the header cell switches 120A may be turned on in a period in which the CPU core 200 is operating, and may be turned off in a period in which the CPU core 200 is not operating.

According to an example embodiment, the plurality of power transistors 120 of the digital LDO regulator 100 of FIG. 1A may be implemented using header cell switches. In an example embodiment, the plurality of power transistors 120 of FIG. 1A may be at least a portion of the header cell switches corresponding to the load block 200, among the header cell switches included in the SoC 1000.

A more detailed description will be provided with reference to FIG. 1B. At least a portion of the header cell switches 120A may perform functions of the plurality of power transistors 120 described above in FIG. 1A. In this case, the at least a portion of the header cell switches 120A may adjust supply current $I_{SUPPLY}$ supplied to the CPU core 200 based on the control code c_code output from the LDO core 110, as described above in FIG. 1A. Except for the header cell switches used as the power transistors 120, the remaining header cell switches may be maintained in a turned-off state even for a period in which the CPU core 200 is operating.

In general, power transistors occupy a largest area in a digital LDO regulator. Therefore, when the digital LDO regulator 100 is configured using the header cell switches 120A included in the SoC 1000 without use of additional power transistors as described above, costs may be significantly reduced in terms of area of the SoC 1000.

When the digital LDO regulator 100 is configured using the header cell switches 120A, delay may occur due to a physical distance between the LDO core 110 and the header cell switches 120A. The term "delay" may refer to time it takes for the state of the output voltage $V_{OUT}$ to be detected after the control code is output from the LDO core 110, based on the control code.

The delay may degrade the performance of the digital LDO regulator 100. For example, when the control mode changes from the fast mode to the slow mode, the digital LDO regulator 100 may operate further in the fast mode by delay time. In this case, the LDO core 110 may additionally change the control code c_code in the fast mode by the delay time. As described above, a change in the control code c_code in the fast mode may cause a relatively fast change in the supply current $I_{SUPPLY}$. Accordingly, an additional change in the supply current $I_{SUPPLY}$ in the fast mode may cause strong overshooting of the output voltage $V_{OUT}$ (here, "overshooting" refers to a large change in the output voltage $V_{OUT}$ irrelevant to a direction). Accordingly, a critical issue on the stability of the digital LDO regulator 100 may occur.

According to an example embodiment, the LDO core 110 may perform a step-back operation. The step-back operation may be an operation to re-output the (previous) control code c_code output at least one cycle ago. In an example embodiment, the LDO core 110 may perform a step-back operation and operate in the slow mode when the state of the output voltage $V_{OUT}$ corresponding to the slow mode is detected while operating in the fast mode.

In this case, the amount of change in the control code c_code in fast mode, increased by the delay, may be removed through a step-back operation. Accordingly, strong overshooting of the output voltage $V_{OUT}$ may be significantly reduced, and the output voltage $V_{OUT}$ may converge to the target voltage more rapidly.

According to an example embodiment, the LDO core 110 may perform a negative step operation. The negative step operation may be an operation to output a (opposite) control code c_code changed in a direction opposite to the direction in which the control code c_code, output while operating in the fast mode, is changed. In an example embodiment, when the state of the output voltage corresponding to the slow mode is detected while operating in the fast mode, the LDO core 110 may perform a step-back operation, and may perform a negative step operation for a predetermined time in the slow mode.

For example, the output voltage $V_{OUT}$ may not reach the target voltage even after the step-back operation. In this case, according to an example embodiment, the LDO core 110 may change and output the control code c_code in the same direction as the direction in which the control code c_code, output while operating in the fast mode, is changed. In this case, a difference between the supply current $I_{SUPPLY}$ and the load current $I_{LOAD}$ may be further increased, and thus a slope of the change in the output voltage $V_{OUT}$ toward the target voltage may also be increased to cause overshooting of the output voltage $V_{OUT}$.

Therefore, according to an example embodiment, the LDO core 110 may perform a negative step operation for a predetermined time after the step-back operation. In this case, the difference between the supply current $I_{SUPPLY}$ and the load current $I_{LOAD}$ may be reduced, and thus the slope of the change in the output voltage $V_{OUT}$ toward the target voltage may also be reduced. As a result, the output voltage $V_{OUT}$ may stably converge toward the target voltage without overshooting.

According to the above-described various embodiments, a digital LDO regulator may be embedded in an SoC with a smaller area. In addition, a voltage required for intellectual property (IP) blocks in the SoC may be supplied more stably. In addition, the amount of droop of the output voltage $V_{OUT}$ may be reduced, and thus power consumption of the SoC may also be reduced.

Figure 2:
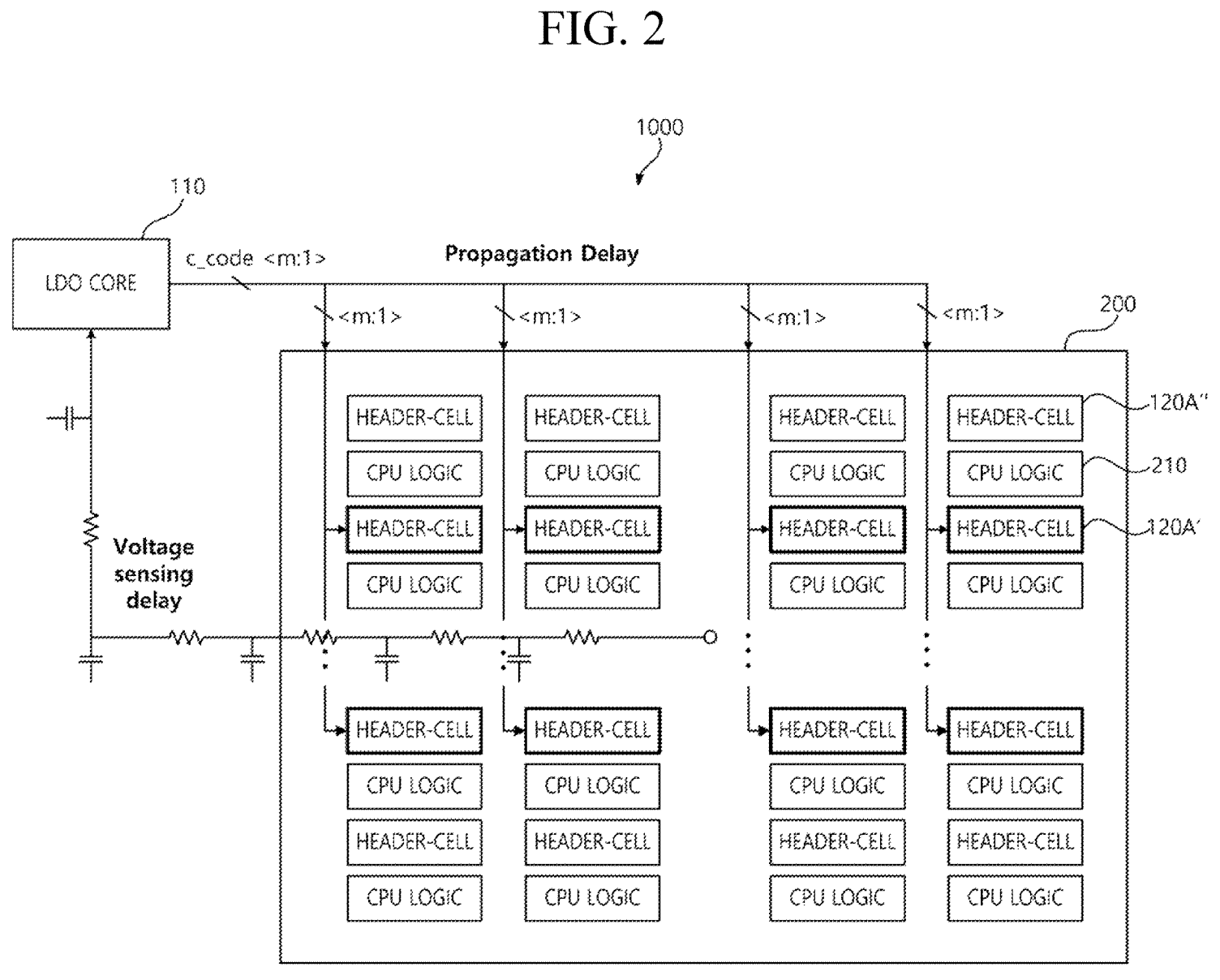

FIG. 2 is a conceptual diagram illustrating a configuration of an SoC according to an example embodiment. Referring to FIG. 2, an SoC 1000 may include an LDO core 110, a CPU core 200, and header cell switches 120A' and 120A".

The CPU core 200 may include a plurality of CPU logic cells 210. All of the CPU logic cells 210, included in the CPU core 200, may receive power through the header cell switches 120A' and 120A".

In this case, according to an example embodiment, a portion of the header cell switches 120A' and 120A" may be used as power transistors 120 of the digital LDO regulator 100. In an example embodiment, the header cell switches 120A' and the LDO core 110 may constitute the digital LDO regulator 100 described above in FIGS. 1A and 1B. In this case, a power supply voltage provided to the CPU core 200 through the header cell switches 120A' may be the output voltage $V_{OUT}$ of the above-described digital LDO regulator 100.

In this case, the LDO core 110 may detect the state of the output voltage $V_{OUT}$ provided to the CPU core 200. In an example embodiment, the LDO core 110 may detect the output voltage $V_{OUT}$ at a midpoint of an entire region in which the header cell switches 120A' and 120A" are disposed, but example embodiments are not limited thereto. Accordingly, the LDO core 110 may select a control mode based on the detected state of the output voltage $V_{OUT}$, and may output an m-bit control code c_code<m:1> based on the selected control mode. The header cell switches 120A' may adjust the supply current $I_{SUPPLY}$ provided to the CPU core 200 based on the m-bit control code c_code<m:1> output from the LDO core 110. Accordingly, the output voltage $V_{OUT}$ provided to the CPU core 200 may be adjusted.

There is a physical distance between the LDO core 110 and the header cell switches 120A'. Accordingly, when the header cell switches 120A" are used as the power transistors 120 of the digital LDO regulator 100, there is a delay in the operation of the digital LDO regulator 100. In this case, the delay may include a propagation delay, which is the time it takes for the control code c_code to propagate to the header cell switches 120A', and a voltage sensing delay which is the time it takes for the LDO core 110 to detect the state of the output voltage $V_{OUT}$ changed based on the control code c_code. As described above, such a delay may have an adverse effect on the performance of the digital LDO regulator 100.

Therefore, according to an example embodiment, the LDO core 110 may perform a step-back operation. For example, when the total delay time which is the sum of the propagation delay time and the voltage sensing delay time is N cycles with respect to an operation cycle of the digital LDO regulator 100, the LDO core 110 may perform an N cycle step-back operation. In an example embodiment, when the state of the output voltage $V_{OUT}$ corresponding to the slow mode is detected while operating in the fast mode, the LDO core 110 may perform an N-cycle step-back operation to re-output the control code output N cycles ago and may operate in the slow mode.

According to an example embodiment, the LDO core 110 may perform a negative step operation for a predetermined time after the step-back operation. For example, in the above example embodiment, when the state of the output voltage $V_{OUT}$ corresponding to the slow mode is detected while operating in the fast mode, the LDO core 110 may performs an N cycle step-back operation, and may perform a negative step operation for a predetermined time in the slow mode.

Through the step-back operation and negative step operation described above, the output voltage $V_{OUT}$ drooped in an upward or downward direction may converge to the target voltage more rapidly and stably. In addition, the amount of droop of the output voltage $V_{OUT}$ is reduced, so that a power supply voltage provided from a PMIC to the SoC 1000 may be decreased. Accordingly, the power consumed by the SoC may be reduced.

An example has been provided in which a portion 120A' of the header cell switches 120A' and 120A" are used as power transistors 120, but example embodiments are not limited thereto. According to an example embodiment, all of the header cell switches 120A' and 120A" may be used as power transistors 120 of the digital LDO regulator 100.

Hereinafter, a configuration and an operation of an LDO core according to example embodiments will be described in detail with reference to FIGS. 3 to 5. In the description provided with reference to FIGS. 3 to 5, redundant descriptions will be omitted.

Figure 3:
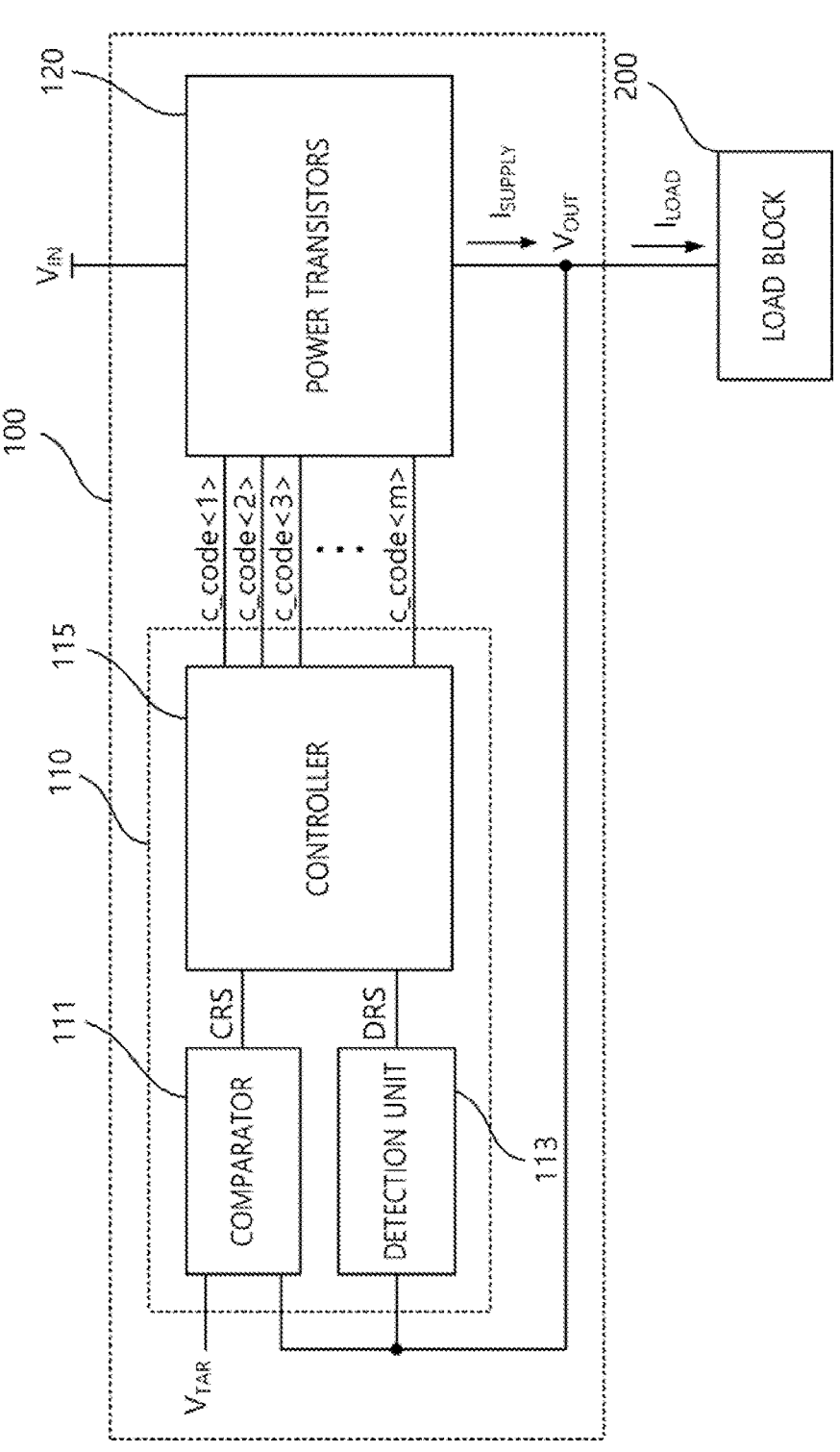
FIG. 3 is a block diagram illustrating the configuration of an SoC according to an example embodiment.

FIG. 3 is a block diagram illustrating a configuration of an SoC according to an example embodiment. Referring to FIG. 3, an SoC 1000 may include a digital LDO regulator 100 and a load block 200.

The digital LDO regulator 100 may receive a power supply voltage VIN from a PMIC outside the SoC 1000, and may generate an output voltage $V_{OUT}$. A load block 200 may operate based on an output voltage $V_{OUT}$. In this case, the digital LDO regulator 100 may adjust the output voltage $V_{OUT}$ such that the output voltage $V_{OUT}$ converges to a target voltage $V_{TAR}$. The target voltage $V_{TAR}$ may be a voltage predefined based on the specification of the load block 200, and may be an operating voltage of the load block 200. Because a margin is useful considering transmission loss or droop of the output voltage $V_{OUT}$, the power supply voltage VIN provided by the PMIC may be set to be higher than the target voltage $V_{TAR}$.

For example, the digital LDO regulator 100 may include an LDO core 110 and a plurality of power transistors 120. The plurality of power transistors 120 may be connected between the power supply voltage VIN and the load block 200, and may be turned on/off depending on a control code c_code. Accordingly, the plurality of power transistors 120 may control supply current $I_{SUPPLY}$ provided to the load block 200, based on the control code c_code. In this case, according to an example embodiment, the plurality of power switches 120 may be at least a portion of the header cell switches corresponding to the load block 200.

The LDO core 110 may detect a state of the output voltage $V_{OUT}$, and may output the control code c_code based on the detected state of the output voltage $V_{OUT}$. According to an example embodiment, the LDO core 110 may select a control mode based on the detected state of the output voltage $V_{OUT}$, and may output a control code c_code based on the selected control mode.

To this end, the LDO core 110 may include a comparator 111, a detection circuit 113, and a controller 115. The comparator 111 may compare the output voltage $V_{OUT}$ and the target voltage $V_{TAR}$ to generate a comparison result signal CRS. Each of the comparator 111, the detection circuit 113, and the controller 115 may be physically implemented by analog and/or digital circuits including one or more of a logic gate, an integrated circuit, a microprocessor, a microcontroller, a memory circuit, a passive electronic component, an active electronic component, and the like.

The detection circuit 113 may detect at least one of whether the output voltage $V_{OUT}$ exceeds a threshold voltage and the direction of change to generate a detection result signal DRS.

The controller 115 may detect the state of the output voltage $V_{OUT}$ based on the comparison result signal CRS and a detection result signal DRS. In addition, the controller 115 may select a control mode based on the detected state of the output voltage $V_{OUT}$, and may output a control code c_code based on the selected control mode.

Figure 4:
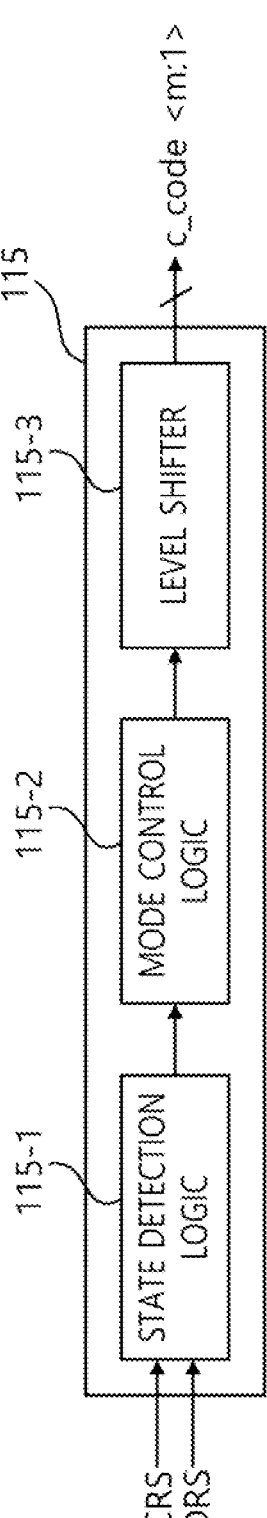
FIG. 4 is a block diagram illustrating an example of how to implement a controller according to an example embodiment.

FIG. 4 is a block diagram illustrating an example of how to implement a controller according to an example embodiment. Referring to FIG. 4, the controller 115 may include a state detection logic 115-1, a mode control logic 115-2, and a level shifter 115-3, each of which may be physically implemented by analog and/or digital circuits including one or more of a logic gate, an integrated circuit, a microprocessor, a microcontroller, a memory circuit, a passive electronic component, an active electronic component, and the like.

The state detection logic 115-1 may detect a state of an output voltage $V_{OUT}$ based on a comparison result signal CRS and a detection result signal DRS.

For example, the state detection logic 115-1 may detect whether the output voltage $V_{OUT}$ is in an undershoot period and an overshoot period, based on the comparison result signal CRS.

In addition, the state detection logic 115-1 may detect whether the output voltage $V_{OUT}$ exceeds a threshold voltage, based on the detection result signal DRS. In an example embodiment, the state detection logic 115-1 may detect whether the output voltage $V_{OUT}$ is lower than a first threshold voltage or exceeds a second threshold voltage, based on the detection result signal DRS. The first threshold voltage may be a threshold voltage set to be lower than a target voltage $V_{TAR}$, and the second threshold voltage may be a threshold voltage set to be higher than the target voltage $V_{TAR}$.

In addition, the state detection logic 115-1 may detect a direction in which the output voltage $V_{OUT}$ is changed, for example, whether the output voltage $V_{OUT}$ is increasing or decreasing, based on the detection result signal DRS.

The mode control logic 115-2 may select a control mode based on the state of the output voltage $V_{OUT}$ detected by the state detection logic 115-1. In this case, the control mode may include the slow mode and the fast mode described above.

In an example embodiment, the mode control logic 115-2 may select the fast mode when the output voltage $V_{OUT}$ is lower than the first threshold voltage in the undershoot period or exceeds the second threshold voltage in the overshoot period. In addition, the mode control logic 115-2 may select the slow mode when the output voltage $V_{OUT}$ is greater than the first threshold voltage in the undershoot period or less than or equal to the second threshold voltage in the overshoot period.

Alternatively, according to an example embodiment, the mode control logic 115-2 may select the fast mode when the output voltage $V_{OUT}$ decreases in the undershoot period or increases in the overshoot period. In addition, the mode control logic 115-2 may select the slow mode when the output voltage $V_{OUT}$ increases in the undershoot period or decreases in the overshoot period.

Alternatively, according to an example embodiment, the mode control logic 115-2 may select the fast mode when the output voltage $V_{OUT}$ is lower than the first threshold voltage and decreases in the undershoot period or when the output voltage $V_{OUT}$ exceeds the second threshold voltage and increases in the overshoot period. In addition, the mode control logic 115-2 may select the slow mode when the output voltage $V_{OUT}$ is greater than the first threshold voltage, or lower than the first threshold voltage and increases in the undershoot period or when the output voltage $V_{OUT}$ is less than or equal to the second threshold voltage, or exceeds the second threshold voltage and decrease in the overshot period.

The mode control logic 115-2 may control an operation of the level shifter 115-3 based on the selected control mode. The level shifter 115-3 may generate a control code c_code under the control of the mode control logic 115-2.

As described above, the digital LDO regulator 100 may adjust the output voltage $V_{OUT}$ toward the target voltage $V_{TAR}$ faster in the fast mode than in the slow mode. Accordingly, parameters for adjusting the output voltage $V_{OUT}$ may be set to be different in the slow mode and the fast mode. For example, the parameters for adjusting the output voltage $V_{OUT}$ may include the amount of change per cycle of the control code c_code, an operating frequency, or the like. Therefore, according to an example embodiment, the amount of change per cycle of the control code c_code may be set to be larger in the fast mode than in the slow mode. In addition, according to an example embodiment, the operating frequency may be set to be faster in the fast mode than in the slow mode.

Therefore, according to an example embodiment, the mode control logic 115-2 may control the operation of the level shifter 115-3 to generate the control code c_code based on a parameter value corresponding to the selected control mode.

In an example embodiment, when the amount of change per cycle of the control code c_code is set to 1 in the slow mode and set to 4 in the fast mode, the mode control logic 115-2 may control the operation of the level shifter 115-3 to change and output a value of the control code c_code by 1 per cycle in the slow mode. In addition, the mode control logic 115-2 may control the operation of the level shifter 115-3 to change and output the value of the control code c_code by 4 per cycle. In an example embodiment, when the operating frequency is set to a first frequency in the slow mode and is set to a second frequency higher than the first frequency in the fast mode, the mode control logic 115-2 may control the operation of the level shifter 115-3 to change and output a value of the control code c_code every first cycle corresponding to the first frequency in the slow mode. In addition, the mode control logic 115-2 may control the operation of the level shifter 115-3 to change and output the value of the control mode c_code every second cycle corresponding to the second frequency.

According to an example embodiment, when the state of the output voltage $V_{OUT}$ corresponding to the slow mode is detected while controlling the operation of the level shifter 115-3 to output the control code c_code in the fast mode, the mode control logic 115-2 may control the operation of the level shifter 115-3 to perform a step-back operation. Accordingly, the level shifter 115-3 may re-output the control code c_code that was output at least one cycle ago with respect to a current cycle in which the state of the output voltage $V_{OUT}$ corresponding to the slow mode is detected.

In an example embodiment, in a system in which delay time is N cycles with respect to an operating cycle of the digital LDO regulator 100, when the state of the output voltage $V_{OUT}$ corresponding to the slow mode is detected while operating in the fast mode, the mode control logic 115-2 may control the operation of the level shifter 115-3 to re-output the control code c_code output N cycles ago.

In this case, in an example embodiment, the mode control logic 115-2 may control the operation of the level shifter 115-3 to output the control code c_code in the slow mode after performing the step-back operation.

According to an example embodiment, the mode control logic 115-2 may control the operation of the level shifter 115-3 to perform a step-back operation when the state of the output voltage $V_{OUT}$ corresponding to the slow mode is detected while controlling the operation of the level shifter 115-3 to output the control code c_code in the fast mode, and to perform a negative step operation during predetermined time in the slow mode. In this case, the negative step operation may be an operation to change and output a control code c_code in a direction opposite to the direction in which the control code c_code, output while operating in the fast mode, is changed.

For example, the mode control logic 115-2 may control the operation of the level shifter 115-3 to perform the step-back operation when the state of the output voltage $V_{OUT}$ is detected while control the operation of the level shifter 115-3 to increase and output the control code c_code for each cycle in the fast mode. Then, the mode control logic 115-2 may control the operation of the level shifter 115-3 to decrease and output the control code c_code for each cycle for predetermined time in the slow mode.

When the state of the output voltage $V_{OUT}$ corresponding to the slow mode is detected while controlling the operation of the level shifter 115-3 to decrease and output the control code c_code for each cycle in the fast mode, the mode control logic 115-2 may control the operation of the level shifter 115-3 to increase and output the control code c_code for each cycle for predetermined time in the slow mode after performing the step-back operation.

The predetermined time, a time for which the negative step operation is performed in the slow mode, may be a time until the output voltage $V_{OUT}$ reaches a target voltage $V_{TAR}$. Therefore, according to an example embodiment, the mode control logic 115-2 may control the operation of the level shifter 115-3 to perform the negative step operation until the output voltage $V_{OUT}$ reaches the target voltage $V_{TAR}$ after the step-back operation.

Alternatively, the predetermined time may be a predetermined number of cycle times. Therefore, according to an example embodiment, the mode control logic 115-2 may control the operation of the level shifter 115-3 to perform a negative step operation for a predetermined number of cycles after the step-back operation.

Alternatively, the predetermined time may be a cycle time corresponding to the amount of change in the control code c_code re-output by the step-back operation. Therefore, according to an example embodiment, after the step-back operation, the mode control logic 115-2 may control the operation of the level shifter 115-3 to perform a negative step operation for a number of cycles corresponding to the amount of change in the control code c_code re-output by the step-back operation. The operation of the level shifter 115-3 may be controlled to perform the operation. For example, when the control code c_code is changed by 8 codes due to a step-back operation, the mode control logic 115-2 may control the operation of the level shifter 115-3 to perform a negative step operation during 8 cycles after the step-back operation.

According to an example embodiment, the mode control logic 115-2 may control the operation of the level shifter 115-3 to output the control code c_code in the fast mode when the state of the output voltage $V_{OUT}$ corresponding to the fast mode is detected while controlling the operation of the level shifter 115-3 to output the control code c_code in the slow mode.

Figure 5:
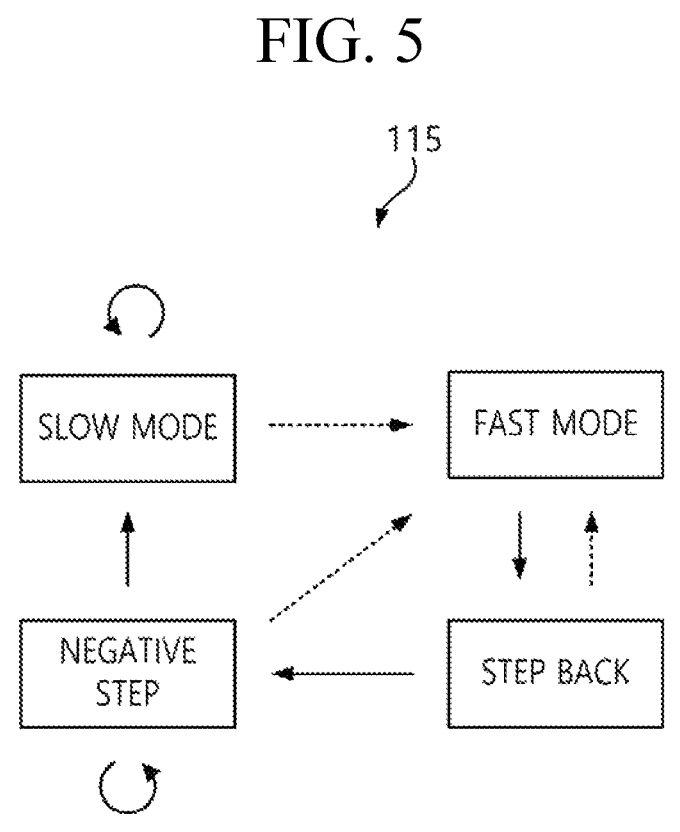

FIG. 5 is a diagram illustrating a finite state machine (FSM) related to the operation of the controller 115 according to an example embodiment. In FIG. 5, solid arrows indicate a case in which the state of the output voltage $V_{OUT}$ corresponding to the slow mode is detected, and dotted arrows indicate a case in which the state of the output voltage $V_{OUT}$ corresponding to the fast mode is detected.

For ease of description, FIG. 5 distinguishes between a negative step state and a slow mode state. The negative step state and the slow mode state in FIG. 5 are different in directions in which the control code c_code is changed. For example, in the negative step state, the controller 115 may output a control code c_code changed in a direction opposite to a direction in which a control code c_code, output while operating in the fast mode, is changed. In the slow mode state, the controller 115 may output a control code c_code changed in the same direction as the direction in which the control code c_code, output while operating in the fast mode, is changed. However, parameters for adjusting the output voltage $V_{OUT}$, such as the amount of change per cycle or an operating frequency of the control code c_code, may be set in the same way in both the negative step state and the slow mode state.

Referring to FIG. 5, when the state of the output voltage $V_{OUT}$ corresponding to the fast mode is detected while the controller 115 operates in the slow mode state, the controller 115 may immediately operate in the fast mode.

When the state of the output voltage $V_{OUT}$ corresponding to the slow mode is detected while the controller 115 operates in the fast mode state, the controller 115 may operate in the negative step state after passing through the step-back state. In this case, the controller 115 may operate in a negative step state for a predetermined time and then operate in the slow mode state. Since the predetermined time is the same as described above, a redundant description is omitted.

Even if the controller 115 is in the step-back state or the negative step state, the controller 115 may immediately operate in the fast mode state when the output voltage $V_{OUT}$ corresponding to the fast mode is detected.

Unlike what is illustrated in FIG. 5, according to an example embodiment, the controller 115 may directly operate in the slow mode state without the negative step state after passing through the step-back state when the state of the output voltage $V_{OUT}$ corresponding to the slow mode is detected while operating in the fast mode state.

According to an example embodiment, the controller 115 may be implemented in various forms through logic circuits based on the FSM illustrated in FIG. 5.

FIGS. 6A to 6D are diagrams illustrating an operation of a digital LDO regulator according to example embodiments.

As described above, a droop (for example, increase or decrease) of the output voltage $V_{OUT}$ may occur due to a sudden change in load current $I_{LOAD}$. In this case, the digital LDO regulator 100 may adjust the output voltage $V_{OUT}$ by adjusting supply current $I_{SUPPLY}$ such that the drooped output voltage $V_{OUT}$ converges to a target voltage $V_{TAR}$.

Figure 6A:
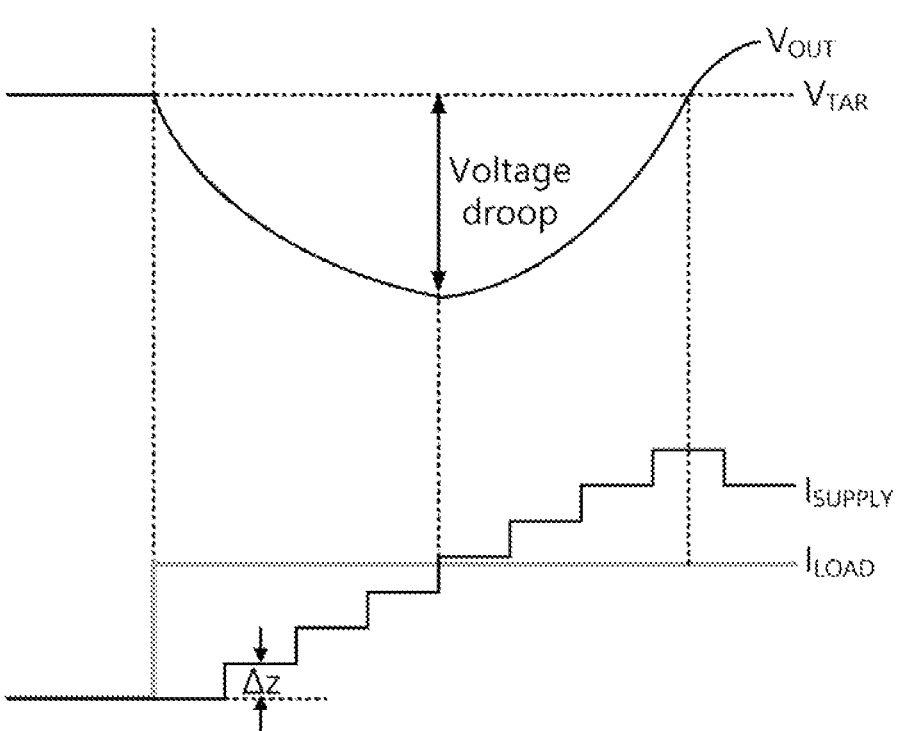
FIG. 6A is a diagram illustrating an example in which an output voltage droops.

FIG. 6A illustrates a case in which an output voltage $V_{OUT}$ decreases due to a sudden increase in load current $I_{LOAD}$. In this case, the amount of a decrease in voltage may increase as a difference between the load current $I_{LOAD}$ and supply current $I_{SUPPLY}$ increases, the time it takes for the supply current $I_{SUPPLY}$ to follow the change in the load current $I_{LOAD}$ increases, and a capacitance value of a decoupled capacitor of the digital LDO regulator 100 decreases.

According to an example embodiment, the LDO regulator 100 may operate only in slow mode in an undershoot period. In this case, the digital LDO regulator 100 may operate based on a parameter corresponding to the slow mode. However, the amount of change in a control code c_code per cycle may be set to be relatively small in the slow mode. Accordingly, the amount of change $\Delta z$ in the supply current $I_{SUPPLY}$ per cycle may be relatively small in the slow mode. In this case, the time it takes for the supply current $I_{SUPPLY}$ to follow the change in the load current $I_{LOAD}$ increases, which may cause the output voltage $V_{OUT}$ to decrease significantly.

According to an example embodiment, the digital LDO regulator 100 may operate only in fast mode in an undershoot period. In the fast mode, the amount of change in the control code c_code per cycle increases and thus, the amount of change in the supply current $I_{SUPPLY}$ per cycle may also increases. Accordingly, the time it take for the supply current $I_{SUPPLY}$ to follow the change in the load current $I_{LOAD}$ may be reduced, and the amount of droop of the output voltage $V_{OUT}$ may be reduced. However, in this case, static ripple my increase, and the time it takes for the output voltage $V_{OUT}$ to converge to a target voltage $V_{TAR}$ may increase.

In FIG. 6A, an undershoot period has been provided as an example, the above-described contents may be equally applied to an overshoot period.

Therefore, according to an example embodiment, the digital LDO regulator 100 may select either one of a slow mode and a fast mode based on a predetermined criterion and operate depending on the selected control mode to reduce dynamic ripple while decreasing the amount of droop of the output voltage $V_{OUT}$.

Figure 6B:
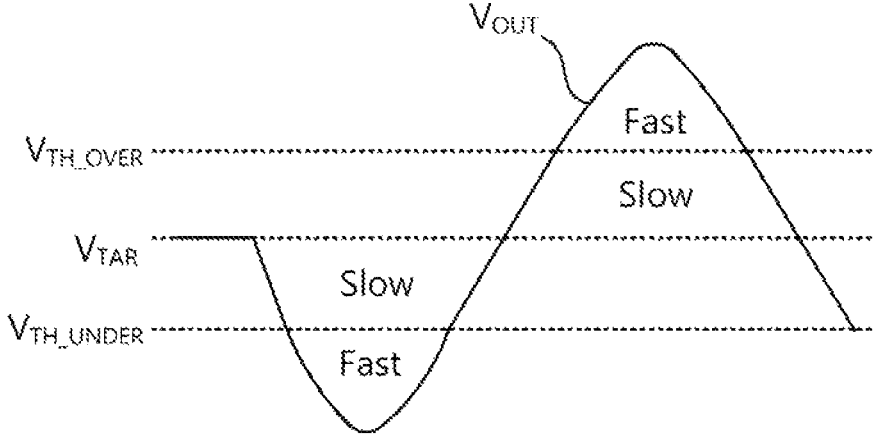
FIG. 6B is a diagram illustrating an example in which a control mode is changed based on whether an output voltage exceeds a threshold voltage.
Figure 6C:
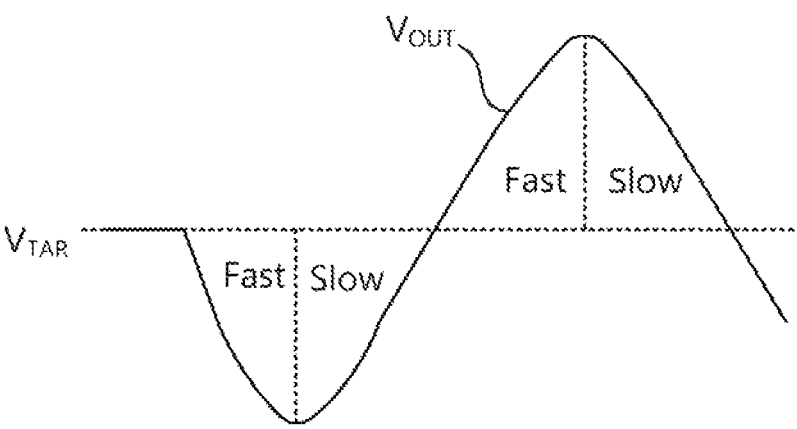
FIG. 6C is a diagram illustrating an example in which the control mode is changed based on a direction in which the output voltage is changed.
Figure 6D:
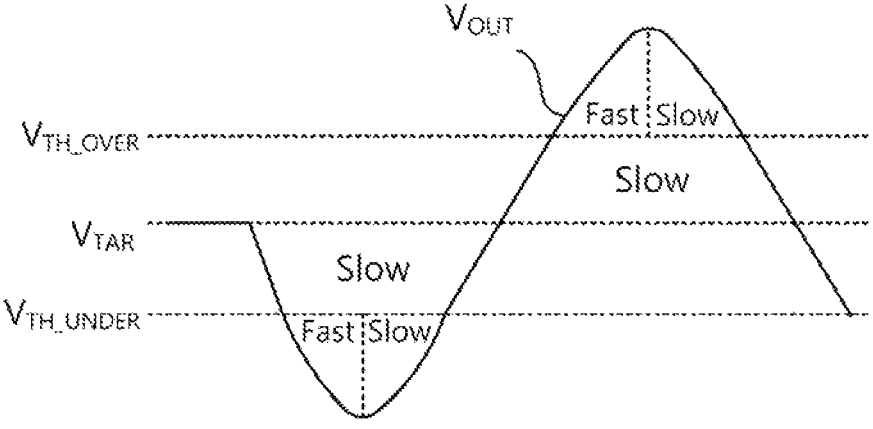
FIG. 6D is a diagram illustrating an example in which the control mode is changed based on whether the output voltage exceeds the threshold voltage and the direction in which the output voltage is changed.

FIGS. 6B to 6D are diagrams illustrating various embodiments in which a control mode is changed depending on a state of an output voltage $V_{OUT}$.

FIG. 6B illustrates an example in which a control mode is changed based on whether an output voltage $V_{OUT}$ exceeds a threshold voltage. Referring to FIG. 6B, the digital LDO regulator 100 may operate in fast mode when the output voltage $V_{OUT}$ is lower than a first threshold voltage $V_{TH\_UNDER}$ in an undershoot period or when the output voltage $V_{OUT}$ exceeds a second threshold voltage $V_{TH\_OVER}$ in an overshoot period. In addition, the digital LDO regulator 100 may operate in slow mode when the output voltage $V_{OUT}$ is greater than or equal to the first threshold voltage $V_{TH\_UNDER}$ in the undershoot period or when the output voltage $V_{OUT}$ is less than or equal to the second threshold voltage $V_{TH\_OVER}$ in the overshoot period.

FIG. 6C illustrates an example in which a control mode is changed based on a direction in which an output voltage $V_{OUT}$ is changed. Referring to FIG. 6C, the digital LDO regulator 100 may operate in fast mode when the output voltage $V_{OUT}$ decreases in an undershoot period or when the output voltage $V_{OUT}$ increases in an overshoot period. Additionally, the digital LDO regulator 100 may operate in slow mode when the output voltage $V_{OUT}$ increases in the undershoot period or when the output voltage $V_{OUT}$ decreases in the overshoot period.

FIG. 6D illustrates an example in which a control mode is changed based on whether an output voltage $V_{OUT}$ exceeds a threshold voltage and a direction in which the output voltage $V_{OUT}$ is changed. Referring to FIG. 6D, the digital LDO regulator 100 may operate in fast mode when the output voltage $V_{OUT}$ is lower than a first threshold voltage $V_{TH\_UNDER}$ and decreases in an undershoot period, or when the output voltage $V_{OUT}$ exceeds a second threshold voltage $V_{TH\_OVER}$ and increases in an overshoot period. In addition, the digital LDO regulator 100 may operate when the output voltage $V_{OUT}$ is greater than or equal to the first threshold voltage $V_{TH\_UNDER}$ in the undershoot period or is lower than the first threshold voltage $V_{TH\_UNDER}$ and increases in the undershoot period, or when the output voltage $V_{OUT}$ is lower than or equal to the second threshold voltage $V_{TH\_OVER}$ in the overshoot period or exceeds the second threshold voltage $V_{TH\_OVER}$ in the overshoot period.

As described in the examples of FIGS. 6B to 6D, when the digital LDO regulator 100 operates in the slow mode or the fast mode based on a predetermined criterion, the amount of droop of the output voltage $V_{OUT}$ may be reduced and dynamic ripple may be reduced. However, when there is a delay as described in FIGS. 1B and 2, stability and performance of the digital LDO regulator 100 may be deteriorated.

Figure 7A:
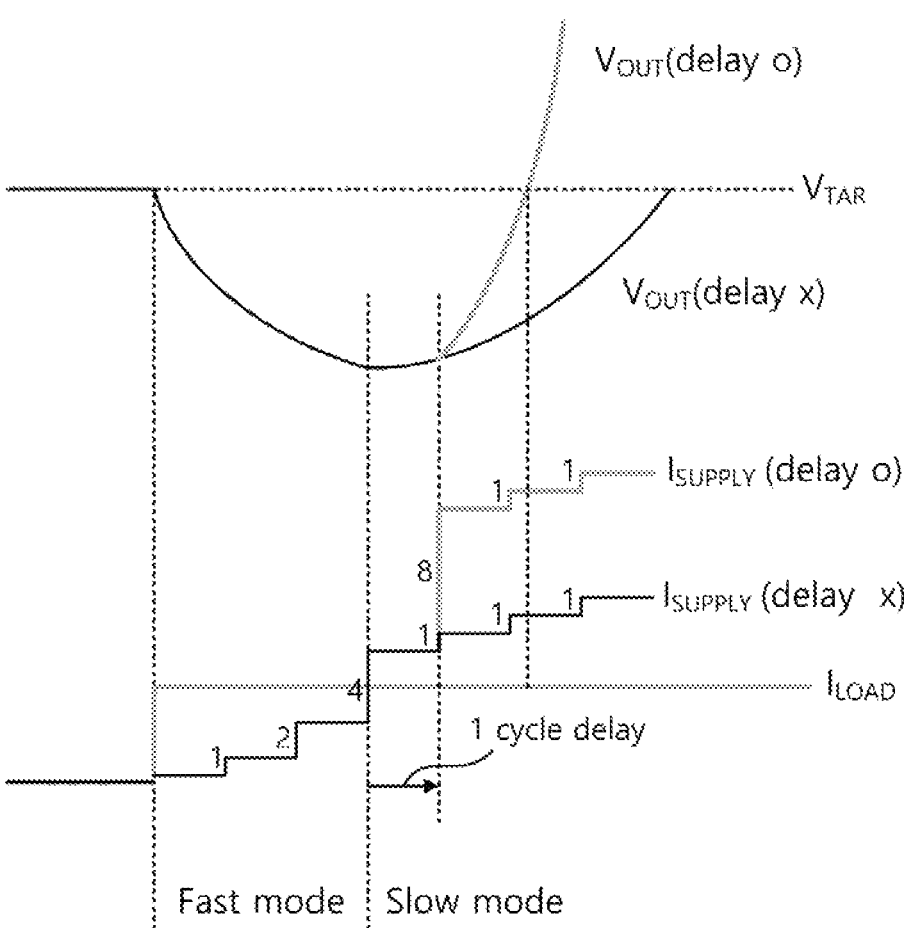
FIG. 7A is a diagram illustrating an example of changes in supply current and output voltage depending on the presence or absence of delay.
Figure 7B:
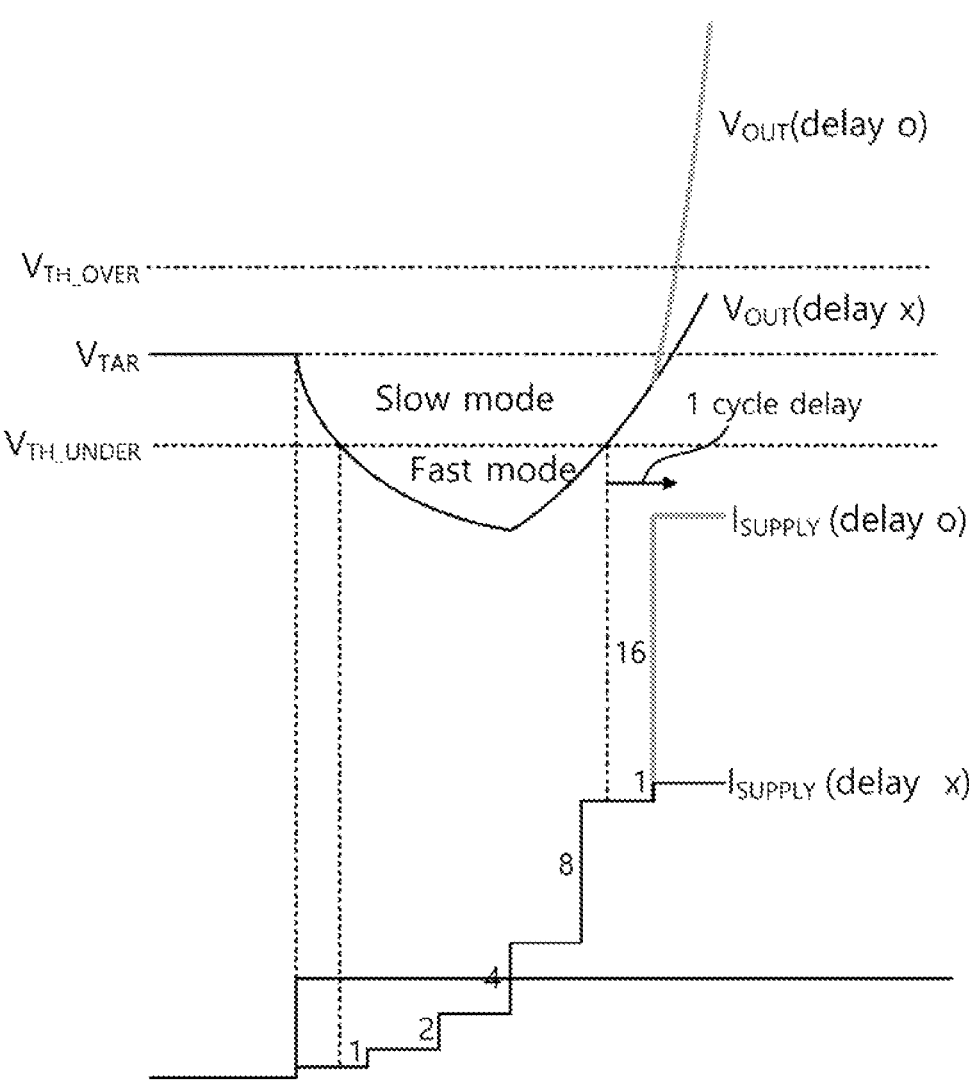
FIG. 7B is a diagram illustrating an example of changes in supply current and output voltage depending on the presence or absence of delay.

FIGS. 7A and 7B are diagrams illustrating deterioration of stability and performance of a digital LDO regulator, caused by a delay.

FIG. 7A illustrates changes in supply current $I_{SUPPLY}$ and output voltage $V_{OUT}$ depending on the presence or absence of a delay, in a system in which control mode is changed based on a direction in which the output voltage $V_{OUT}$ is changed as illustrated in FIG. 6C. In FIG. 7A, an example is provided in which a delay time is 1 cycle, and the amount of change per cycle of a control code c_code is set to 1 in slow mode and is set to be twice the amount of change in a previous cycle in fast mode.

Referring to FIG. 7A, the digital LDO regulator 100 may operate in fast mode while an output voltage $V_{OUT}$ decreases in an undershoot period. In this case, the digital LDO regulator 100 may increase a value of the control code c_code by twice a value of a previous cycle for each cycle. Accordingly, supply current $I_{SUPPLY}$ may also increase stepwise by twice that of the previous cycle.

When the increased supply current $I_{SUPPLY}$ is greater than load current $I_{LOAD}$, the decreased output voltage $V_{OUT}$ may increase. A state, in which the output voltage $V_{OUT}$ increases in an undershoot unit, may correspond to a slow mode.

In this case, when there is no delay, the digital LDO regulator 100 may immediately detect an increase in the output voltage $V_{OUT}$, and may operate in slow mode. In slow mode, the digital LDO regulator 100 may increase a value of the control code c_code by 1 for each cycle, so the supply current $I_{SUPPLY}$ may also increase stepwise by 1 from a cycle in which the output voltage $V_{OUT}$ starts to increase. $I_{SUPPLY}$ (delay x) denotes a change in supply current $I_{SUPPLY}$ when there is no delay. Accordingly, as indicated by $V_{OUT}$(delay x), the output voltage $V_{OUT}$ may increase toward a target voltage $V_{TAR}$ without a sudden increase.

However, when there is one cycle of delay, the digital LDO regulator 100 may detect an increase in the output voltage $V_{OUT}$ after one cycle from a cycle in which the output voltage $V_{OUT}$ starts to increase. Accordingly, the digital LDO regulator 100 may operate in slow mode after operating in fast mode for one more cycle, compared with the case of no delay.

As described above, when the digital LDO regulator 100 operates in the fast mode for one more cycle due to the delay, strong overshooting may occur in the output voltage $V_{OUT}$, resulting in deterioration of stability and performance of the digital LDO regulator 100.

For example, referring to FIG. 7A, the supply current $I_{SUPPLY}$ may already be greater than the load current $I_{LOAD}$ at a time point at which the output voltage $V_{OUT}$ starts to increase. In this case, when the digital LDO regulator 100 operates in fast mode for one more cycle, a difference between the supply current $I_{SUPPLY}$ and the load current $I_{LOAD}$ may further increase, as indicated by $I_{SUPPLY}$(delay o). Accordingly, strong overshooting may occur in the output voltage $V_{OUT}$, as illustrated by $V_{OUT}$(delay o).

For example, as in the example of FIG. 7A, when the amount of change in the control code c_code per cycle in fast mode is twice that of a previous cycle, the supply current $I_{SUPPLY}$ has already increased at a time point at which the output voltage $V_{OUT}$ starts to increase, so that the supply current $I_{SUPPLY}$ may further significantly increase with only one cycle of delay. Accordingly, strong overshooting of the output voltage $V_{OUT}$ may occur.

The above-described phenomenon caused by a delay may repeatedly occur even when the output voltage $V_{OUT}$ decreases again toward the target voltage $V_{TAR}$ after strong overshooting. In this case, the stability of the digital LDO regulator 100 may be lost. Even when the stability is not lost, settling time of the output voltage $V_{OUT}$ may be significantly increased, or the output voltage $V_{OUT}$ may have a significantly large ripple.

FIG. 7B illustrates changes in supply current $I_{SUPPLY}$ and output voltage $V_{OUT}$ depending on presence or absence of a delay, in a system in which control mode is changed based on whether the output voltage $V_{OUT}$ exceeds a threshold voltage, as illustrated in FIG. 6B. FIG. 7B also illustrates a case in which similarly to FIG. 7A, delay time is one cycle and the amount of change per cycle of a control code c_code is set to 1 in slow mode and set to be twice the amount of change in a previous cycle in fast mode.

Referring to FIG. 7B, when the output voltage $V_{OUT}$ is greater than or equal to a first threshold voltage $V_{TH\_UNDER}$ in an undershoot period, the digital LDO regulator 100 may operate in slow mode.

When the output voltage $V_{OUT}$ is continuously decreased to be lower than the first threshold voltage $V_{TH\_UNDER}$, the digital LDO regulator 100 may operate in the fast mode. In this case, the digital LDO regulator 100 may increase a value of the control code c_code by twice a previous cycle for each cycle. Accordingly, the supply current $I_{SUPPLY}$ may also increase stepwise by twice the previous cycle. When the increased supply current $I_{SUPPLY}$ is greater than the load current $I_{LOAD}$, the decreased output voltage $V_{OUT}$ may increase.

When the output voltage $V_{OUT}$ is continuously increased to be greater than or equal to the first threshold voltage $V_{TH\_UNDER}$, the digital LDO regulator 100 may operate in slow mode.

In this case, when there is no delay, the digital LDO regulator 100 may immediately detect that the output voltage $V_{OUT}$ reaches the first threshold voltage $V_{TH\_UNDER}$ and may operate in slow mode. In the slow mode, the digital LDO regulator 100 increases the value of the control code c_code by 1 for each cycle, so that the supply current $I_{SUPPLY}$ may also increase stepwise by 1 from a cycle in which the output voltage $V_{OUT}$ reaches the first threshold voltage $V_{TH\_UNDER}$. $I_{SUPPLY}$(delay x) denotes a change in supply current $I_{SUPPLY}$ when there is no delay. Accordingly, the output voltage $V_{OUT}$ may increase toward a target voltage $V_{TAR}$ without a sudden increase, as indicated by $V_{OUT}$(delay x).

However, when there is one cycle of delay, the digital LDO regulator 100 may detect that the output voltage $V_{OUT}$ reaches the first threshold voltage $V_{TH\_UNDER}$ after one cycle from a cycle in which the output voltage $V_{OUT}$ reaches the first threshold voltage $V_{TH\_UNDER}$. Accordingly, the digital LDO regulator 100 may operate in the slow mode after operating for one more cycle in the fast mode, compared with the case in which there is no delay.

As described above, when the digital LDO regulator 100 operates in the fast mode for one more cycle due to the delay, strong overshooting may occur in the output voltage $V_{OUT}$, resulting in deterioration of stability and performance of the digital LDO regulator 100.

For example, referring to FIG. 7B, when the output voltage $V_{OUT}$ reaches the first threshold voltage $V_{TH\_UNDER}$, the supply current $I_{SUPPLY}$ may already be greater than load current $I_{LOAD}$. In this case, when the digital LDO regulator 100 operates in fast mode for one more cycle, a difference between the supply current $I_{SUPPLY}$ and the load current $I_{LOAD}$ may be further increased, as indicated by $I_{SUPPLY}$ (delay o). Accordingly, strong overshooting may occur in the output voltage $V_{OUT}$, as indicated by $V_{OUT}$(delay o). The above-described phenomenon caused by a delay may be repeatedly occur even when the output voltage $V_{OUT}$ decreases again toward the target voltage $V_{TAR}$ after strong overshooting. In this case, stability of the digital LDO regulator 100 may be lost, and the stability of the digital LDO regulator 100 may be deteriorated, for example, settling time of the output voltage $V_{OUT}$ may be significantly increased or the output voltage $V_{OUT}$ may have a significantly large ripple.

As an example, a case has been described in which delay time is one cycle has been described, but the delay time is not limited thereto. For example, the longer the delay time, the more likely it is that overshooting will occur.

In addition, overshooting of the output voltage $V_{OUT}$ caused by a delay in the undershoot period has been described in detail, but overshooting of the output voltage $V_{OUT}$ caused by a delay may also occur in the overshoot period based on the same principle.

In addition, as an example, a case has been described in which the amount of change per cycle of the control code c_code in fast mode is set to be twice that of a previous cycle, but example embodiments are not limited thereto. For example, even when the change per cycle of the control code c_code in fast mode is set to have a constant value larger than that of slow mode or when an operating frequency increases in fast mode compared with slow mode, the above-described issue caused by a delay may occur.

Figure 8A:
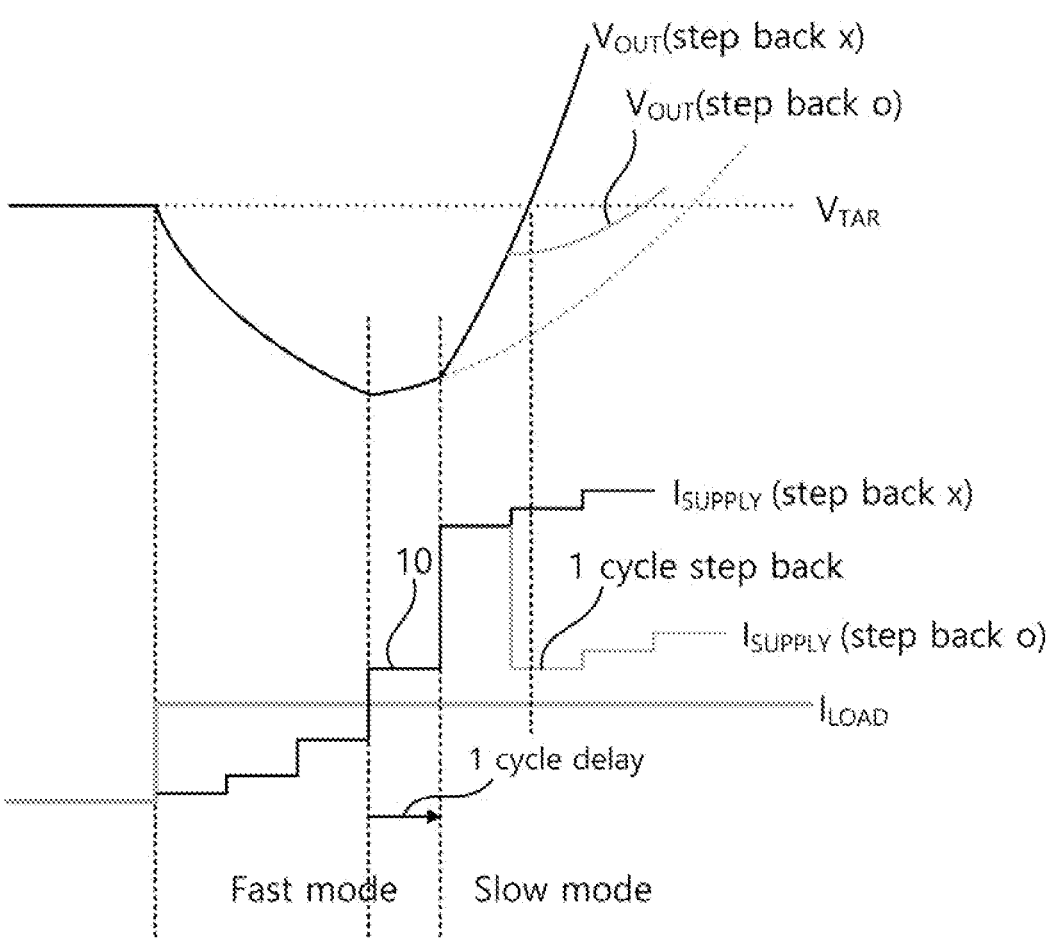
FIG. 8A is a diagram illustrating a step-back operation according to an example embodiment.

FIG. 8A is a diagram illustrating a step-back operation according to an example embodiment. FIG. 8A illustrates changes in supply current $I_{SUPPLY}$ and output voltage $V_{OUT}$ depending on presence or absence of a step-back operation, in a system in which control mode is changed based on a direction in which the output voltage $V_{OUT}$ is changed as illustrated in FIG. 6C. Also, FIG. 8A illustrates a case in which there is delay time of one cycle and the amount of change per cycle of a control code c_code in fast mode is set to be twice that of a previous cycle. In the description provided with reference to FIG. 8A, redundant descriptions overlapped with those of FIG. 7 will be omitted.

In FIG. 8A, $I_{SUPPLY}$ (step back x) and $V_{OUT}$ (step back x) indicate changes in supply current $I_{SUPPLY}$ and output voltage $V_{OUT}$ when there is no step-back operation, respectively. In this case, strong overshoot of the output voltage $V_{OUT}$ may occur due to a delay, as described in FIG. 7A.

In addition, $I_{SUPPLY}$ (step-back o) and $V_{OUT}$ (step-back o) indicate changes in supply current $I_{SUPPLY}$ and output voltage $V_{OUT}$ when there is a step-back operation, respectively. Referring to FIG. 8A, the digital LDO regulator 100 may perform a step-back operation when a state of the output voltage $V_{OUT}$ corresponding to slow mode is detected while operating in fast mode. In FIG. 8A, an example is provided in which the delay time is one cycle, so that the digital LDO regulator 100 may perform one cycle of step-back operation to re-output a control code 10 before one cycle with respect to a cycle in which an output voltage $V_{OUT}$ corresponding to slow mode is detected.

Accordingly, the amount of change in the control code c_code increased due to a delay may be removed through the step-back operation. In this case, the output voltage $V_{OUT}$ does not overshoot. Accordingly, stability of the digital LDO regulator 100 may be secured, and settling time may be significantly reduced compared with setting time when the step-back operation is not performed. In addition, the amount of droop of the output voltage $V_{OUT}$ is reduced, so that a power supply voltage provided from a PMIC may decrease compared with a case in which the step-back operation is not performed, resulting in a gain in terms of power.

Figure 8B:
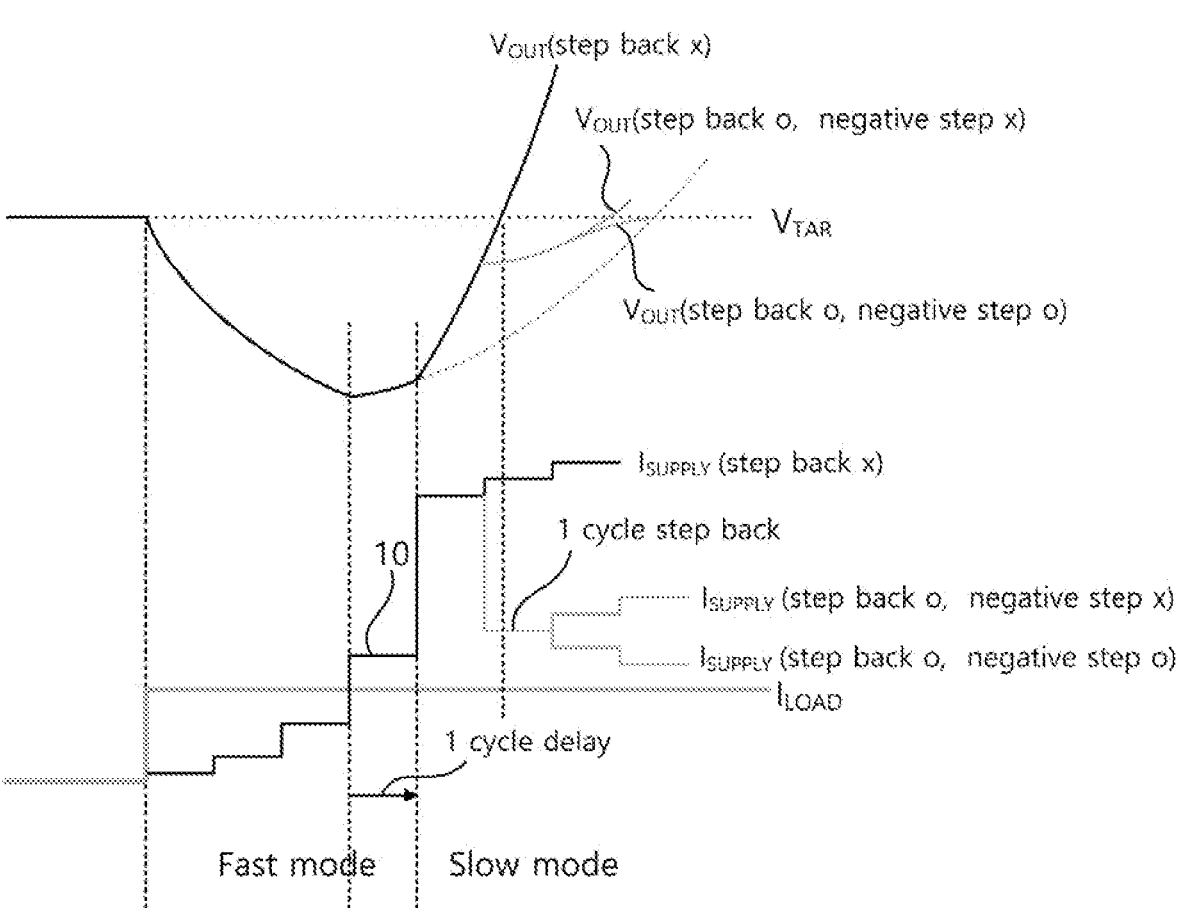
FIG. 8B is a diagram illustrating a negative step operation according to an example embodiment.

FIG. 8B is a diagram illustrating a negative step operation according to an example embodiment. Compared with FIG. 8A, FIG. 8B additionally illustrates changes in supply current $I_{SUPPLY}$ and output voltage $V_{OUT}$ depending on presence or absence of a negative step operation. Since remaining contents are the same as described with reference to FIG. 8A, redundant descriptions are omitted.

Even the above-described step-back operation may be significantly effective in securing stability and reducing settling time, but an effect of additionally securing the stability and reducing the settling time may be obtained through the negative step operation.

For example, according to an example embodiment, the digital LDO regulator 100 may perform a negative step operation for a predetermined time after performing a step-back operation. In this case, the negative step operation may be an operation of outputting a control code c_code changed in a direction opposite to a direction in which the control code c_code, output while operating in fast mode, is changed. Referring to FIG. 8, the control code c_code is changed in an increasing direction in the fast mode, so that the digital LDO regulator 100 may decrease and output the control code c_code for each cycle when performing the negative step operation. $I_{SUPPLY}$ (step-back o, negative step o) indicates a change in supply current $I_{SUPPLY}$ when both the step-back operation and the negative step operation are performed.

Referring to FIG. 8B, even after one cycle of step-back operation, the output voltage $V_{OUT}$ is still lower than the target voltage $V_{TAR}$. However, the supply current $I_{SUPPLY}$ has already exceeded the load current $I_{LOAD}$. Therefore, when the control code c_code is further increased after the step-back operation, a difference between the supply current $I_{SUPPLY}$ and the load current $I_{LOAD}$ may become larger, as indicated by $I_{SUPPLY}$ (step-back o, negative step x). As a result, a slope of change in the output voltage $V_{OUT}$ increases, as indicated by $V_{OUT}$ (step-back o, negative step x), which may result in overshooting of the output voltage $V_{OUT}$.

However, when a negative step operation is performed for a predetermined time after the step-back operation, the difference between the supply current $I_{SUPPLY}$ and the load current $I_{LOAD}$ may be reduced, as indicated by $I_{SUPPLY}$ (step-back o, negative step o). Accordingly, the output voltage $V_{OUT}$ may have a waveform that slowly and stably converges toward the target voltage $V_{TAR}$, as indicated by $V_{OUT}$ (step-back o, negative step o).

While the step-back operation and negative step operation in the undershoot period have been described, but example embodiments are not limited thereto. The concepts of the above-described step-back operation and negative step operation may be similarly applied to the overshoot period. In this case, the direction in which the output voltage $V_{OUT}$ is changed, the direction in which the supply current $I_{SUPPLY}$ is changed, the direction in which the control code c_code is changed, or the like, may be opposite to those in the undershoot period.

Figure 9A:
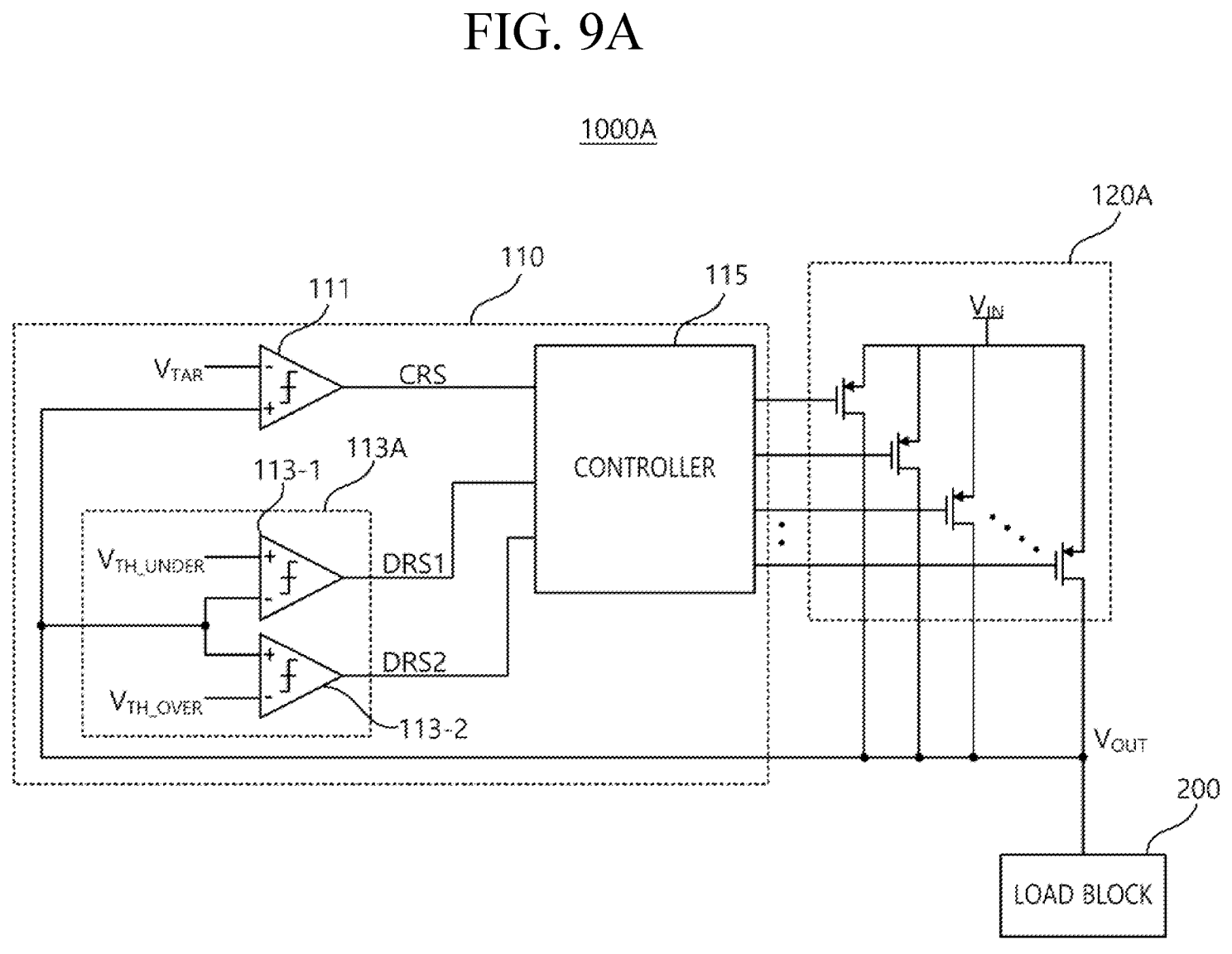
Figure 9B:
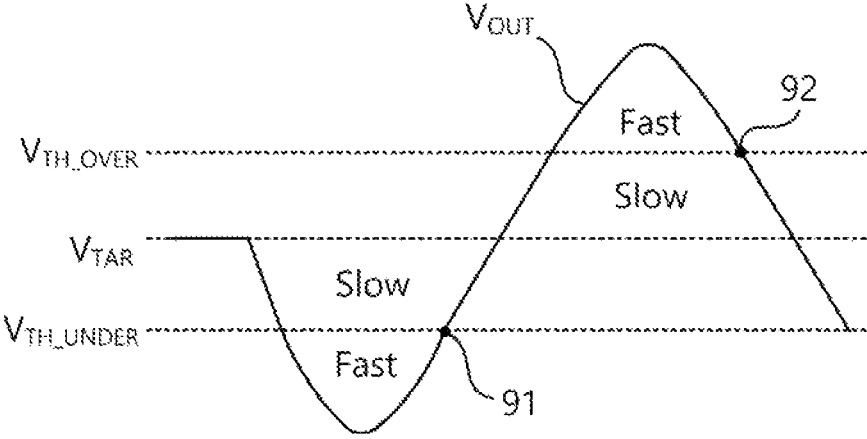
FIG. 9B is a diagram illustrating an operation of the digital LDO regulator of FIG. 9A.

FIGS. 9A and 9B are diagrams illustrating a configuration and an operation of a digital LDO regulator according to an example embodiment. In the description provided with reference to FIGS. 9A and 9B, redundant descriptions will be omitted.

Referring to FIG. 9A, a system-on-chip (SoC) 1000A may include an LDO core 110, header cell switches 120A, and a load block 200. The LDO core 110 and header cell switches 120A may constitute the digital LDO regulator 100.

The LDO core 110 may include a first comparator 111, a threshold voltage excess detection circuit 113A, and a controller 115. The first comparator 111 may compare an output voltage $V_{OUT}$ and a target voltage $V_{TAR}$ to generate a comparison result signal CRS. The comparison result signal CRS may include a logic low signal (for example, "0") and a logic high signal (for example, "1"). For example, the first comparator 111 may generate "0" when the output voltage $V_{OUT}$ is lower than the target voltage $V_{TAR}$ and "1" when the output voltage $V_{OUT}$ is higher than the target voltage $V_{TAR}$, and may then output "0" and "1" to the controller 115.

The threshold voltage excess detection circuit 113A may detect whether the output voltage $V_{OUT}$ is lower than a first threshold voltage $V_{TH\_UNDER}$ and whether the output voltage $V_{OUT}$ exceeds a second threshold voltage $V_{TH\_OVER}$. To this end, the threshold voltage excess detection circuit 113A may include a second comparator 113-1 and a third comparator 113-2.

The second comparator 113-1 may compare the output voltage $V_{OUT}$ and the first threshold voltage $V_{TH\_UNDER}$ to generate a first detection result signal DRS1. In this case, the first threshold voltage $V_{TH\_UNDER}$ may be a predetermined voltage lower than the target voltage $V_{TAR}$. The first detection result signal DRS1 may include a logic low signal (for example, "0") and a logic high signal (for example, "1"). For example, the second comparator 113-1 generate "1" when the output voltage $V_{OUT}$ is lower than the first threshold voltage $V_{TH\_UNDER}$ and "0" when the output voltage $V_{OUT}$ is higher than the first threshold voltage $V_{TH\_UNDER}$, and may then output "1" and "0" to the controller 115.

The third comparator 113-2 may generate compare the output voltage $V_{OUT}$ and the second threshold voltage $V_{TH\_OVER}$ to generate a second detection result signal DRS2. In this case, the second threshold voltage $V_{TH\_OVER}$ may be a predetermined voltage higher than the target voltage $V_{TAR}$. The second detection result signal DRS2 may include a logic low signal (for example, "0") and a logic high signal (for example, "1"). For example, the third comparator 113-2 may generate "0" when the output voltage $V_{OUT}$ is lower than the second threshold voltage $V_{TH\_OVER}$ and "1" when the output voltage $V_{OUT}$ is higher than the second threshold voltage $V_{TH\_OVER}$, and may then output "0" and "1" to the controller 115.

The controller 115 may detect a state of the output voltage $V_{OUT}$ based on the comparison result signal CRS and the detection result signals DRS1 and DRS2. For example, the controller 115 may detect whether the output voltage $V_{OUT}$ is in an undershoot period or an overshoot period, based on the comparison result signal CRS. In addition, the controller 115 may detect whether the output voltage $V_{OUT}$ is lower than the first threshold voltage $V_{TH\_UNDER}$ or higher than the second threshold voltage $V_{TH\_OVER}$, based on the detection result signals DRS1 and DRS2.

The controller 115 may select a control mode based on the detected state of the output voltage $V_{OUT}$, and may output a control code c_code based on the selected control mode.

FIG. 9B is a diagram illustrating an operation of the digital LDO regulator of FIG. 9A. Referring to FIG. 9B, the controller 115 may select fast mode when the output voltage $V_{OUT}$ is lower than the first threshold voltage $V_{TH\_UNDER}$ in an undershoot period or when the output voltage $V_{OUT}$ exceeds the second threshold voltage $V_{TH\_OVER}$ in an overshoot period. In addition, the controller 115 may select slow mode when the output voltage $V_{OUT}$ is greater than or equal to the first threshold voltage $V_{TH\_UNDER}$ in the undershoot period or when the output voltage $V_{OUT}$ is less than or equal to the second threshold voltage $V_{TH\_OVER}$ in the overshoot period.

In this case, according to an example embodiment, when the output voltage $V_{OUT}$ is greater than the first threshold voltage $V_{TH\_UNDER}$ while operating in fast mode in the undershoot period, the controller 115 may perform a step-back operation for a predetermined time and may perform a negative step operation for a predetermined time. In addition, when the output voltage $V_{OUT}$ is less than the second threshold voltage $V_{TH\_OVER}$ while operating in fast mode in the overshoot period, the controller 115 may perform a step-back operation, and may perform a negative step operation for a predetermined time. Reference numerals 91 and 92 indicate points at which the step-back operation and the negative step operation are performed, respectively.

Figure 10A:
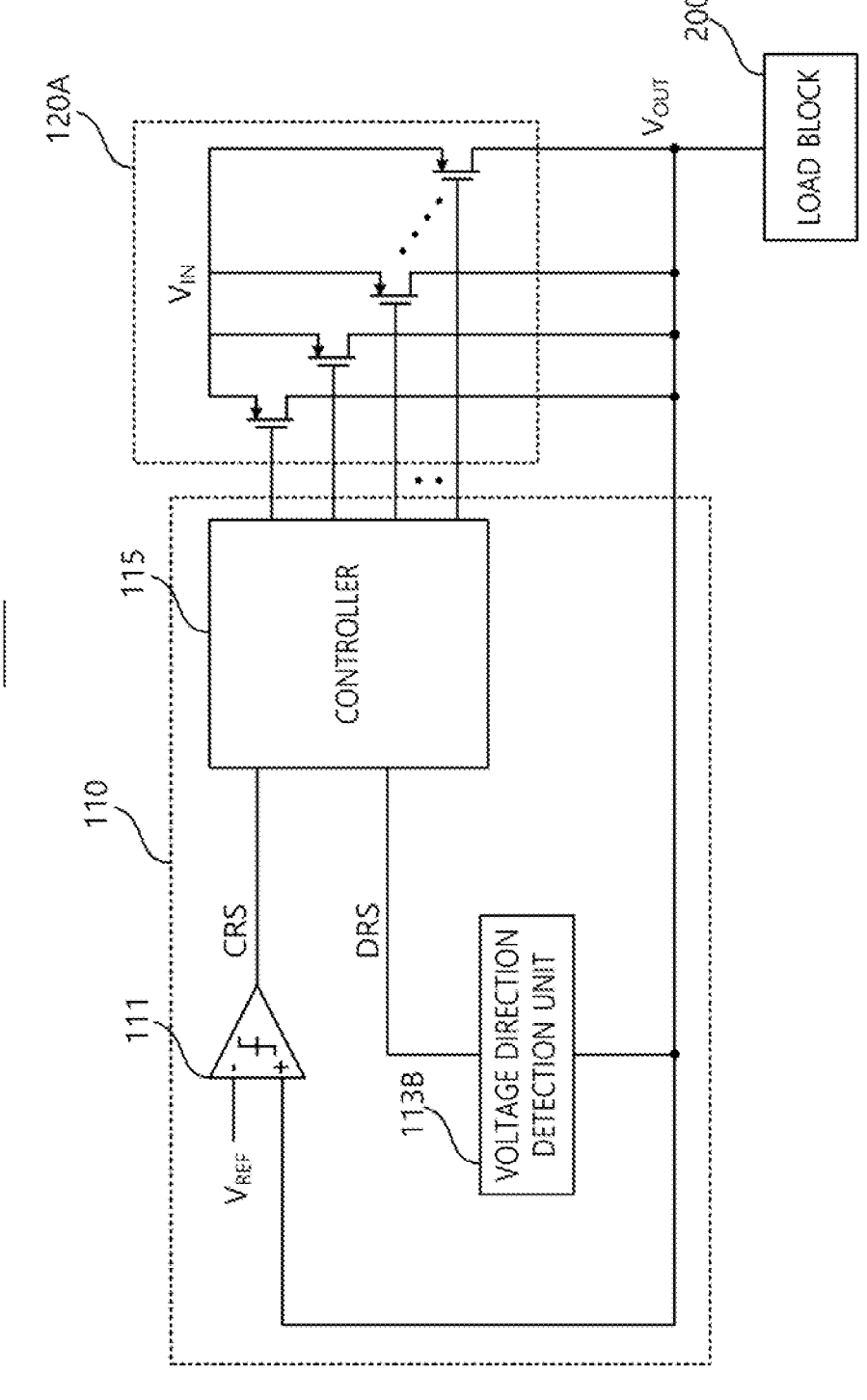
FIG. 10A is a diagram illustrating a configuration of a digital LDO regulator according to an example embodiment.
Figure 10B:
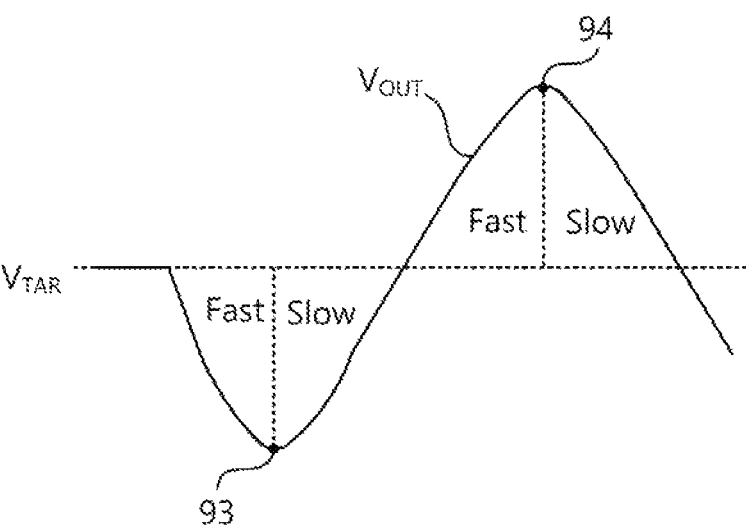
FIG. 10B is a diagram illustrating an operation of the digital LDO regulator of FIG. 10A.

FIGS. 10A and 10B are diagrams illustrating a configuration and an operation of a digital LDO regulator according to an example embodiment. In the description provided with reference to FIGS. 10A and 10B, redundant descriptions will be omitted.

Referring to FIG. 10A, a system-on-chip (SoC) 1000B may include an LDO core 110, header cell switches 120A, and a load block 200. The LDO core 110 and header cell switches 120A may constitute a digital LDO regulator 100.

The LDO core 110 may include a comparator 111, a voltage direction detection circuit 113B, and a controller 115. The comparator 111 has the same configuration as the first comparator 111 of FIG. 9A, and redundant descriptions will be omitted.

The voltage direction detection circuit 113B may detect whether an output voltage $V_{OUT}$ increases or decreases, and may generate a detection result signal DRS. In an example embodiment, the detection result signal DRS may include a logic low signal (for example, "0") and a logic high signal (for example, "1"). For example, the voltage direction detection circuit 113B may generate "1" when the output voltage $V_{OUT}$ increases and "0" when the output voltage $V_{OUT}$ decreases, and may then output "1" or "0" to the controller 115. However, example embodiments are not limited thereto.

The controller 115 may detect the state of the output voltage $V_{OUT}$ based on a comparison result signal CRS and detection result signals DRS1 and DRS2. For example, the controller 115 may detect whether the output voltage $V_{OUT}$ is in an undershoot period or an overshoot period, based on the comparison result signal CRS. In addition, the controller 115 may detect whether the output voltage $V_{OUT}$ increases or decreases, based on the detection result signal DRS.

The controller 115 may select a control mode based on the detected state of the output voltage $V_{OUT}$, and may output a control code c_code based on the selected control mode.

FIG. 10B is a diagram illustrating an operation of the digital LDO regulator of FIG. 10A. Referring to FIG. 10B, the controller 115 may select fast mode when the output voltage $V_{OUT}$ decreases in an undershoot period or when the output voltage $V_{OUT}$ increases in an overshoot period. In addition, the controller 115 may select slow mode when the output voltage $V_{OUT}$ increases in the undershoot period or when the output voltage $V_{OUT}$ decreases in the overshoot period.

In this case, according to an example embodiment, when the output voltage $V_{OUT}$ increases while operating in fast mode in the undershoot period, the controller 115 may perform a step-back operation, and may perform a negative step operation for a predetermined time. In addition, when the output voltage $V_{OUT}$ decreases while operating in fast mode in the overshoot period, the controller 115 may perform a step-back operation, and may perform a negative step operation for a predetermined time. Reference numbers 93 and 94 indicate points at which the step-back operation and the negative step operation are performed, respectively.

Figure 11A:
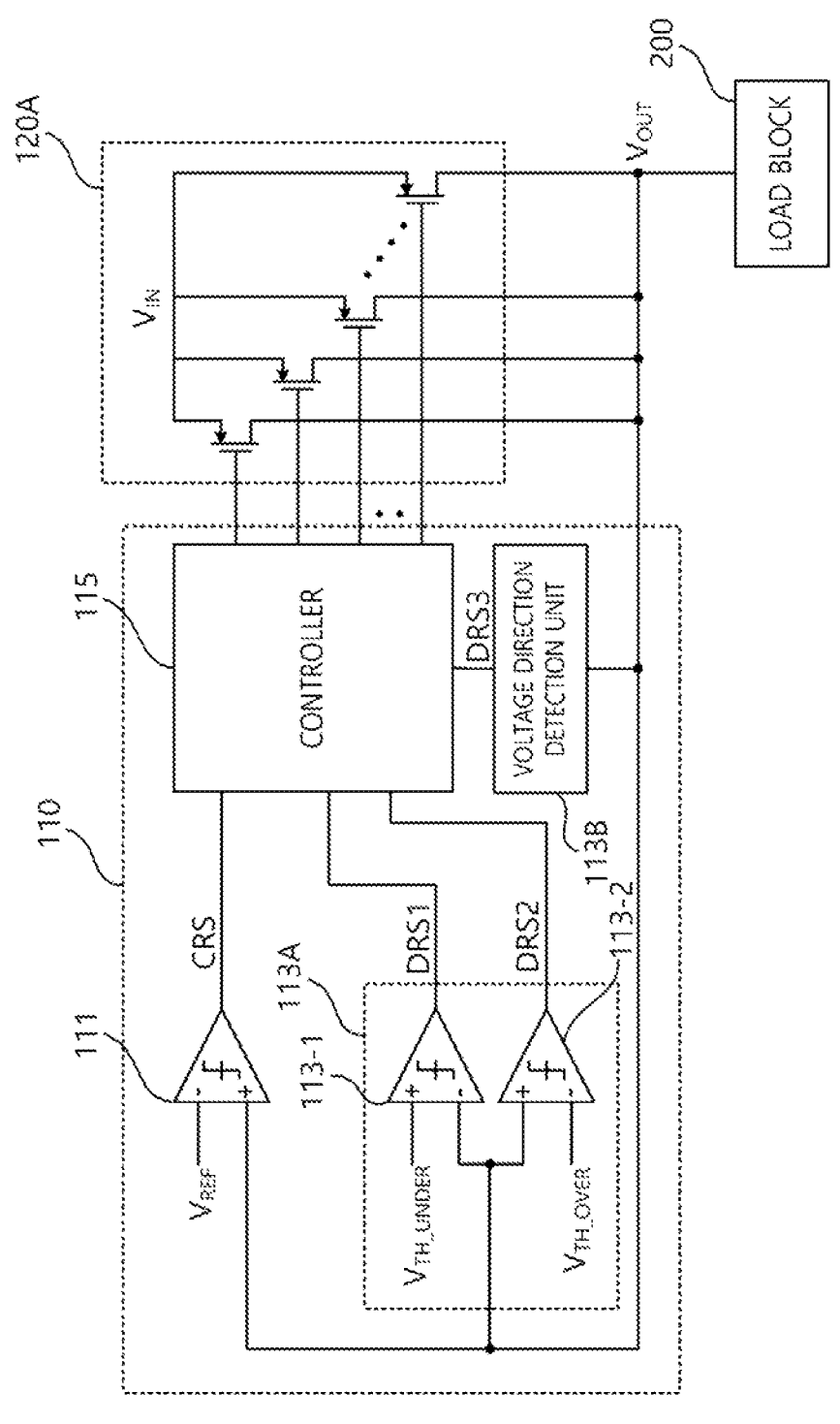
FIG. 11A is a diagram illustrating a configuration of a digital LDO regulator according to an example embodiment.
Figure 11B:
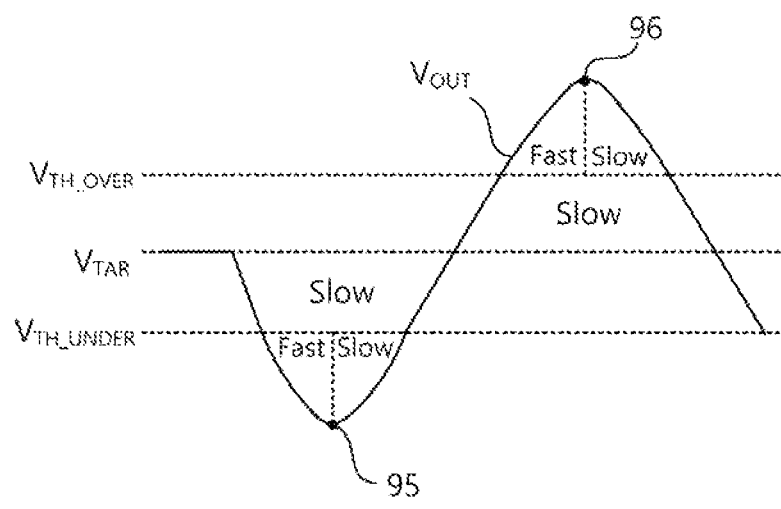
FIG. 11B is a diagram illustrating an operation of the digital LDO regulator of FIG. 11A.

FIGS. 11A and 11B are diagrams illustrating a configuration and an operation of a digital LDO regulator according to an example embodiment. In the description provided with reference to FIGS. 11A and 11B, redundant descriptions will be omitted.

Referring to FIG. 11A, a system-on-chip (SoC) 1000C may include an LDO core 110, header cell switches 120A, and a load block 200. The LDO core 110 and header cell switches 120A may constitute a digital LDO regulator 100.

The LDO core 110 may include a comparator 111, a threshold voltage excess detection circuit 113A, a voltage direction detection circuit 113B, and a controller 115. For the comparator 111, the threshold voltage excess detection circuit 113A, and the voltage direction detection circuit 113B, the above descriptions may be referred to.

The controller 115 may detect a state of the output voltage $V_{OUT}$ based on a comparison result signal CRS and detection result signals DRS1, DRS2, and DRS3. For example, the controller 115 may detect whether the output voltage $V_{OUT}$ is in an undershoot period or an overshoot period, based on the comparison result signal CRS. In addition, the controller 115 may detect whether the output voltage $V_{OUT}$ is lower than a first threshold voltage $V_{TH\_UNDER}$ or higher than a second threshold voltage $V_{TH\_OVER}$, based on the detection result signals DRS1 and DRS2. In addition, the controller 115 may detect whether the output voltage $V_{OUT}$ increases or decreases, based on the detection result signal DRS3.

The controller 115 may select a control mode based on the detected state of the output voltage $V_{OUT}$, and may output a control code c_code based on the selected control mode.

FIG. 11B is a diagram illustrating an operation of the digital LDO regulator of FIG. 11A. Referring to FIG. 11B, the controller 115 may select fast mode when the output voltage $V_{OUT}$ is lower than the first threshold voltage $V_{TH\_UNDER}$ and decreases in the undershoot period. In addition, the controller 115 may select fast mode when the output voltage $V_{OUT}$ exceeds the second threshold voltage $V_{TH\_OVER}$ and increases in the overshoot period.

The controller 115 may select slow mode when the output voltage $V_{OUT}$ is greater than or equal to the first threshold voltage $V_{TH\_UNDER}$ or less than the first threshold voltage $V_{TH\_UNDER}$ and increase in the undershoot period. In addition, the controller 115 may select slow mode when the output voltage $V_{OUT}$ is less than or equal to the second threshold voltage $V_{TH\_OVER}$ or exceeds the second threshold voltage $V_{TH\_OVER}$ and decreases in the overshoot period.

In this case, according to an example embodiment, when the output voltage $V_{OUT}$ increases while operating in fast mode in the undershoot period, the controller 115 may perform a step-back operation, and may perform a negative step operation for a predetermined time. In addition, when the output voltage $V_{OUT}$ decreases while operating in fast mode in the overshoot period, the controller 115 may perform a step-back operation, and may perform a negative step operation for a predetermined time. Reference numerals 95 and 96 indicate points at which the step-back operation and the negative step operation are performed, respectively.

Figure 12:
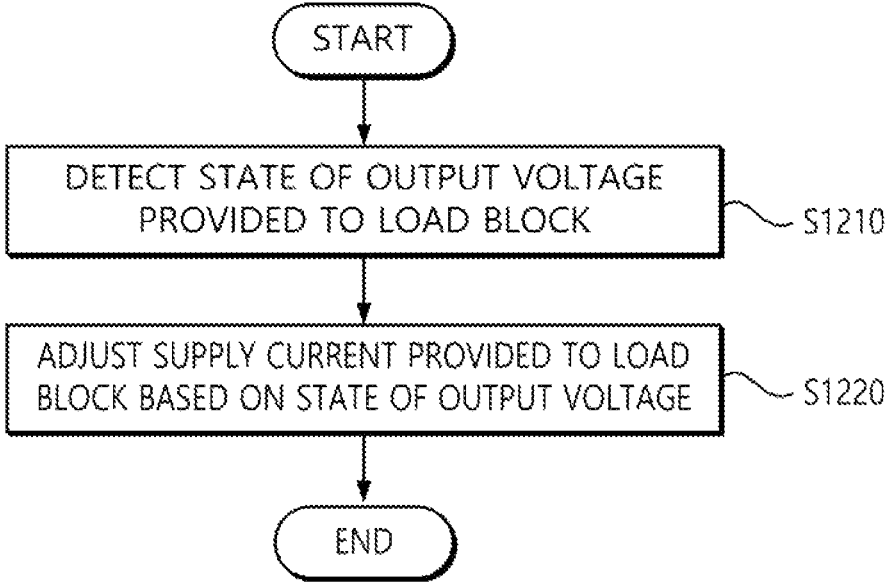
FIG. 12 is a diagram illustrating a method of operating a digital LDO regulator according to an example embodiment.

FIG. 12 is a diagram illustrating a method of operating a digital LDO regulator according to an example embodiment. Referring to FIG. 12, in operation S1210, the digital LDO regulator 100 may detect a state of an output voltage $V_{OUT}$ provided to the load block 200. In this case, according to an example embodiment, the state of the output voltage $V_{OUT}$ may include a first state corresponding to slow mode and a second state corresponding to fast mode for changing supply current $I_{SUPPLY}$ faster than in the slow mode.

In operation S1220, the digital LDO regulator 100 may adjust the supply current $I_{SUPPLY}$ provided to the load block 200 based on the detected state of the output voltage $V_{OUT}$.

For example, the digital LDO regulator 100 may adjust a control code c_code value based on the state of the output voltage $V_{OUT}$. The supply current $I_{SUPPLY}$ may be adjusted based on a value of the control code c_code. In this case, the digital LDO regulator 100 may adjust the value of the control code c_code to change stepwise for each cycle. In an example embodiment, the load block 200 may be a core of a processing unit within a system-on-chip (SoC). In this case, the digital LDO regulator 100 may control turn-on and turn-off operations of at least a portion of header cell switches in the SoC corresponding to the core of the processing unit, among header cell switches in the SoC, through the control code c_code to adjust the supply current $I_{SUPPLY}$.

According to an example embodiment, the digital LDO regulator 100 may adjust the supply current $I_{SUPPLY}$ in slow mode when the output voltage $V_{OUT}$ is in a first state. In addition, the digital LDO regulator 100 may adjust the supply current $I_{SUPPLY}$ in fast mode when the output voltage $V_{OUT}$ is in a second state. In an example embodiment, the digital LDO regulator 100 may increase the amount of change per cycle of the control code c_code in the fast mode, compared with the slow mode. Alternatively, the digital LDO regulator 100 may increase an operating frequency in the fast mode, compared with the slow mode.

Figure 13:
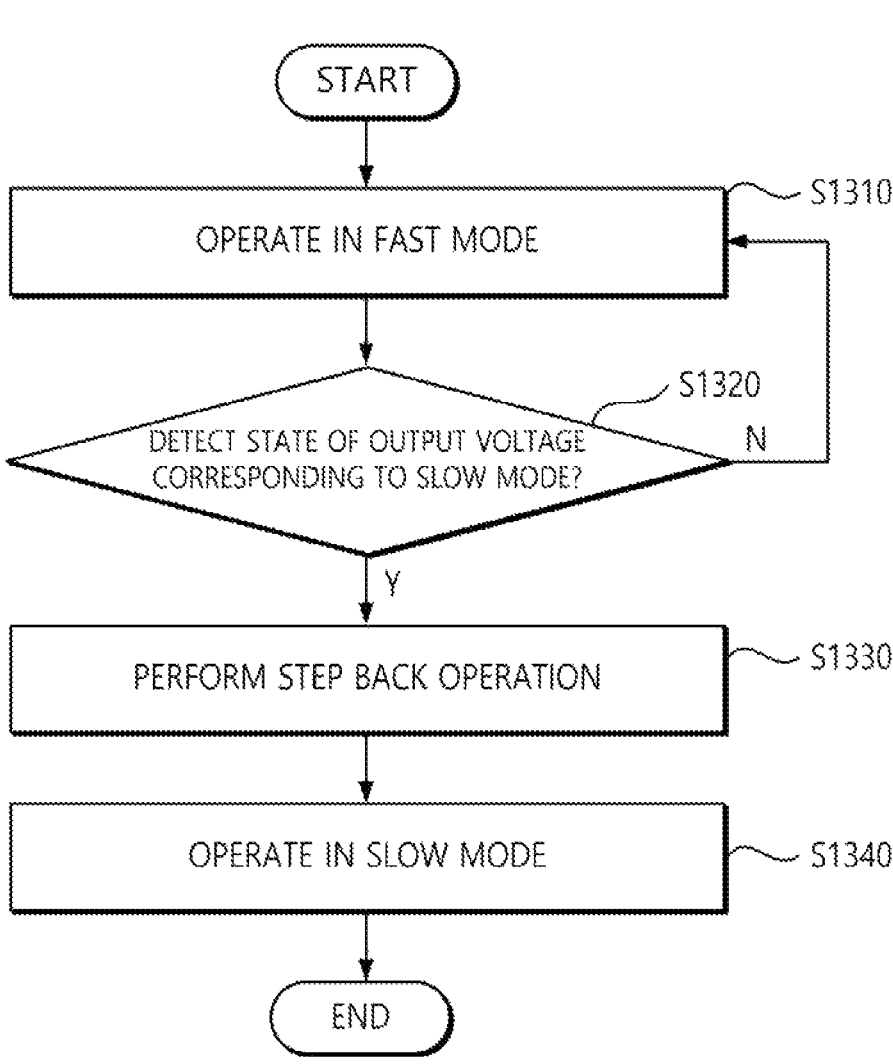
FIG. 13 is a diagram illustrating a method of operating a digital LDO regulator according to an example embodiment.

FIG. 13 is a diagram illustrating a method of operating a digital LDO regulator according to an example embodiment. Referring to FIG. 13, in operation S1310, the digital LDO regulator 100 may operate in fast mode.

In operation S1320, the digital LDO regulator 100 may identify whether the state of the output voltage $V_{OUT}$ corresponding to the slow mode, for example, the first state, is detected while operating in the fast mode. When the first state is not detected (S1320, N), the digital LDO regulator 100 may continue to perform an operation of adjusting supply current $I_{SUPPLY}$ in the fast mode. When the first state is detected (S1320, Y), the digital LDO regulator 100 may perform a step-back operation to re-output the supply current $I_{SUPPLY}$ output at least one cycle ago in operation S1330.

In operation S1340, the digital LDO regulator 100 may operate in the slow mode. According to an example embodiment, in operation S1340, the digital LDO regulator 100 may perform a negative step operation for a predetermined time. In this c case, the negative step operation may be an operation of adjusting the supply current $I_{SUPPLY}$ in a direction opposite to a direction in which the supply current $I_{SUPPLY}$ is adjusted in the fast mode.

FIG. 14 is a diagram illustrating a method of operating a digital LDO regulator according to an example embodiment. Referring to FIG. 14, in operation S1410, the digital LDO regulator 100 may operate in slow mode.

In operation S1420, the digital LDO regulator 100 may identify whether a state of an output voltage $V_{OUT}$ corresponding to fast mode, for example, a second state, is detected while operating in slow mode. When the second state is not detected (S1420, N), the digital LDO regulator 100 may continue to perform an operation of adjusting supply current $I_{SUPPLY}$ in the slow mode. When the second state is detected (S1420, Y), the digital LDO regulator 100 may operate in the fast mode in operation S1430.

Figure 15:
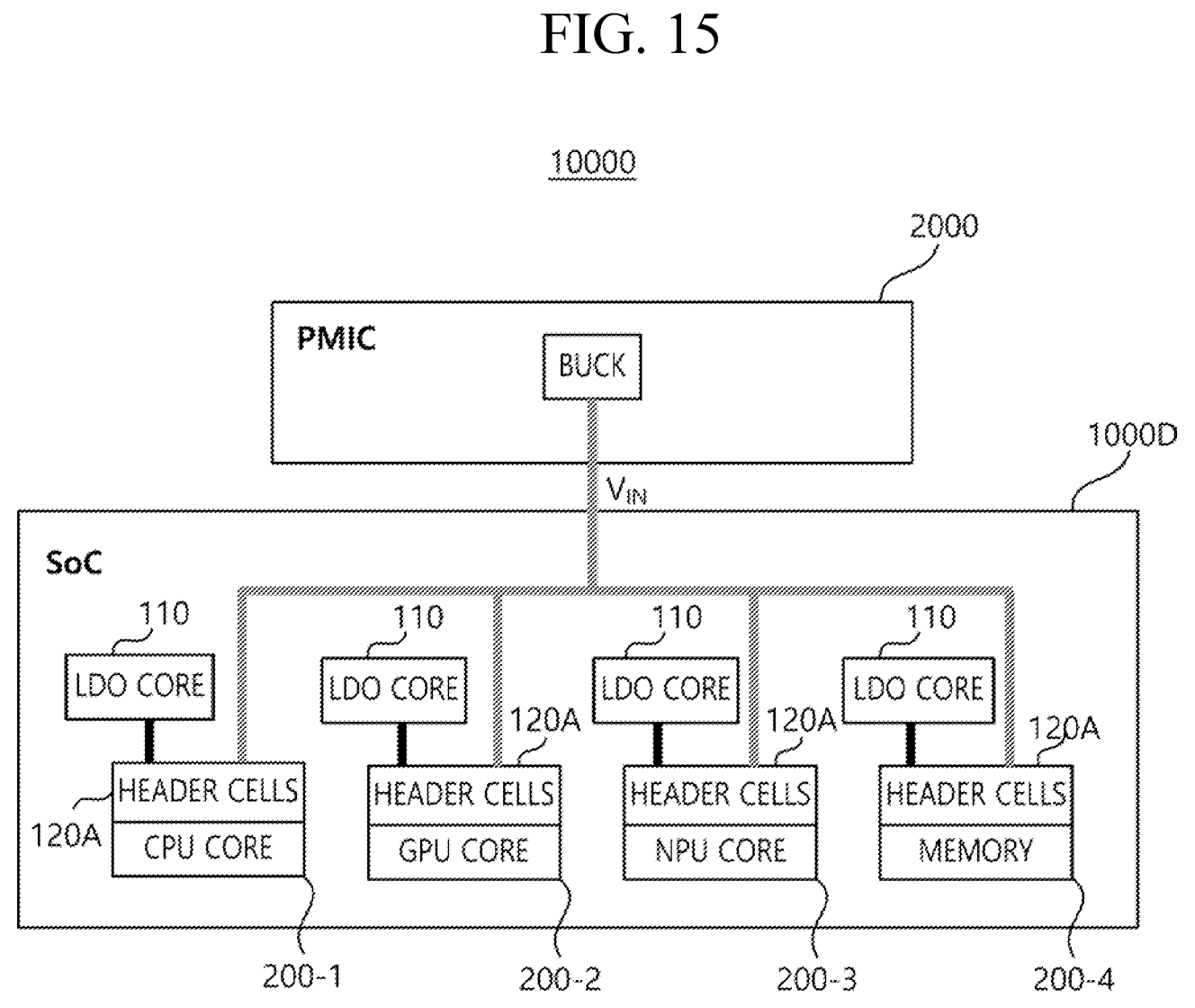

FIG. 15 is a block diagram illustrating a configuration of an electronic device according to an example embodiment. Referring to FIG. 15, an electronic device 10000 may include a PMIC 2000 and an SoC 1000D. In this case, the SoC 1000D may be an application processor including various IP blocks, but example embodiments are not limited thereto.

The PMIC 2000 may provide a single power supply voltage VIN to the SoC 1000D. Accordingly, the number of power routings between PMIC 2000 and SoC 1000D may decrease.

The SoC 1000D may include various intellectual IP blocks such as a CPU core 200-1, a GPU core 200-2, an NPU core 200-3, or a memory 200-4. In this case, magnitudes of power supply voltages, respectively required for the intellectual IP blocks, may be different from each other. The SoC 1000D may include a digital LDO regulator corresponding to each IP block to appropriately adjust and apply a single power supply voltage VIN, applied from the PMIC 2000, for each IP block. The digital LDO regulator corresponding to each IP block may provide an operating voltage, appropriate for the corresponding IP block, as an output voltage $V_{OUT}$.

In this case, according to an example embodiment, the digital LDO regulator corresponding to each IP block may include an LDO core 110 corresponding to an IP block and header cell switches 120A.

Unlike a typical digital LDO regulator, when the header cell switches 120A distributed widely within the SoC 1000D are used as power transistors, a delay may occur in an operation of a digital LDO regulator due to a physical distance between the LDO core 110 and the header cell switches 120A. Such a delay may have an adverse effect on stability and performance of the digital LDO regulator.

However, according to an example embodiment, when the state of the output voltage $V_{OUT}$ corresponding to the slow mode is detected while operating in the fast mode, the LDO core 110 may perform a step-back operation and a negative step operation. Accordingly, the stability of the digital LDO regulator may be secured, and settling time may be significantly reduced. In addition, the amount of droop of the output voltage $V_{OUT}$ is reduced, so that a magnitude of the power supply voltage VIN considering a margin may be decreased to obtain a gain in terms of power.

As set forth above, according to the above-described various embodiments, a digital LDO regulator having a smaller area may be embedded in an SoC. In addition, voltages required for IP blocks in the SoC may be stably supplied. In addition, power consumption of the SoC may be reduced.

While certain example embodiments the disclosure have been particularly shown and described, it will be understood that various changes in form and details may be made therein without departing from the spirit and scope of the following claims.

What is claimed is:

1. A digital low-dropout (LDO) regulator comprising:
an LDO core configured to select a control mode based on a state of an output voltage of the digital LDO regulator provided to a load block and to output a control code based on the control mode; and
a plurality of power transistors configured to control supply current supplied to the load block based on the control code,
wherein the control mode comprises a first mode and a second mode for changing the supply current faster than in the first mode,
wherein the digital LDO regulator is configured for the control code to be changed stepwise for each cycle, and
wherein the LDO core is configured to perform a step-back operation to re-output a previous control code output at least one cycle ago and operate in the first mode based on the state of the output voltage corresponding to the first mode being detected while operating in the second mode.

2. The digital LDO regulator of claim 1, wherein the load block comprises a core of a processor in a system-on-chip (SoC), and
wherein the plurality of power transistors are at least a portion of header cell switches corresponding to the core of the processor, among header cell switches in the SoC.

3. The digital LDO regulator of claim 2, wherein a delay time it takes to detect the state of the output voltage, changed based on the control code and after the control code is output in the LDO core, is N cycles, and
wherein the LDO core is configured to perform the N cycles of the step-back operation to re-output the previous control code output the N cycles ago based on the state of the output voltage corresponding to the first mode being detected while operating in the second mode.

4. The digital LDO regulator of claim 1, wherein the LDO core is configured to increase an amount of change per cycle of the control code in the second mode compared with the first mode, or increase an operating frequency in the second mode compared with the first mode.

5. The digital LDO regulator of claim 1, wherein the LDO core is configured to operate in the second mode based on the state of the output voltage corresponding to the second mode being detected while operating in the first mode.

6. The digital LDO regulator of claim 1, wherein the LDO core is configured to perform the step-back operation and a negative step operation in the first mode for a predetermined time, based on the state of the output voltage corresponding to the first mode being detected while operating in the second mode, and
wherein the negative step operation is outputting an opposite control code changed in an opposite direction to a direction in which the control code, output while operating in the second mode, is changed.

7. The digital LDO regulator of claim 6, wherein the LDO core is configured to perform the negative step operation for a predetermined number of cycles, a number of cycles corresponding to an amount of change in the control code caused by the step-back operation, or until the output voltage reaches a target voltage.

8. The digital LDO regulator of claim 6, wherein the LDO core comprises:
a comparator configured to compare the output voltage and a target voltage and to generate a comparison result signal;
a detection circuit configured to detect at least one of whether the output voltage exceeds a threshold voltage and a direction in which the output voltage is changed and to generate a detection result signal; and
a controller configured to:
detect the state of the output voltage based on the comparison result signal and the detection result signal, to select the control mode based on the state of the output voltage, and to output the control code based on the control mode; and
perform the step-back operation and the negative step operation in the first mode for the predetermined time, based on the state of the output voltage corresponding to the first mode being detected while operating in the second mode.

9. The digital LDO regulator of claim 8, wherein the detection circuit is configured to detect whether the output voltage is lower than a first threshold voltage lower than the target voltage and whether the output voltage exceeds a second threshold voltage higher than the target voltage, and
wherein the controller is configured to:
select the second mode based on the output voltage being lower than the first threshold voltage in an undershoot period in which the output voltage is lower than the target voltage, or based on the output voltage exceeding the second threshold voltage in an overshoot period in which the output voltage is higher than the target voltage; and
select the first mode based on the output voltage being greater than or equal to the first threshold voltage in the undershoot period, or based on the output voltage being less than or equal to the second threshold voltage in the overshoot period.

10. The digital LDO regulator of claim 9, wherein the controller is configured to perform the step-back operation and the negative step operation in the first mode for the predetermined time, based on the output voltage being greater than or equal to the first threshold voltage while operating in the second mode in the undershoot period or the output voltage is less than or equal to the second threshold voltage while operating in the second mode in the overshoot period.

11. The digital LDO regulator of claim 8, wherein the detection circuit is configured to detect whether the output voltage increases or decreases, and
wherein the controller is configured to:

select the second mode based on the output voltage decreasing in an undershoot period in which the output voltage is lower than the target voltage or the output voltage increasing in an overshoot period in which the output voltage is higher than the target voltage, and select the first mode based on the output voltage increasing in the undershoot period or the output voltage decreasing in the overshoot period.

12. The digital LDO regulator of claim 11, wherein the controller is configured to perform the step-back operation and the negative step operation in the first mode for the predetermined time, based on the output voltage increasing while operating in the second mode in the undershoot period or the output voltage decreasing while operating in the second mode in the overshoot period.

13. The digital LDO regulator of claim 8, wherein the detection circuit is configured to detect whether the output voltage is lower than a first threshold voltage lower than the target voltage, whether the output voltage exceeds a second threshold voltage higher than the target voltage, and whether the output voltage increases or decreases, and wherein the controller is configured to:

select the second mode based on the output voltage being lower than the first threshold voltage and decreasing in an undershoot period in which the output voltage is lower than the target voltage, or based on the output voltage exceeding the second threshold voltage and increasing in an overshoot period in which the output voltage is higher than the target voltage, and select the first mode based on the output voltage being greater than or equal to the first threshold voltage or being lower than the first threshold voltage and increasing in the undershoot period, or based on the output voltage being less than or equal to the second threshold voltage or exceeding the second threshold voltage and decreasing in the overshoot period.

14. The digital LDO regulator of claim 13, wherein the controller is configured to perform the step-back operation and the negative step operation in the first mode for the predetermined time, based on the output voltage increasing while operating in the second mode in the undershoot period, or based on the output voltage decreasing while operating in the second mode in the overshoot period.

15. A method of operating a digital low-dropout (LDO) regulator, the method comprising:

detecting a state of an output voltage provided to a load block; and adjusting supply current, provided to the load block, based on the state of the output voltage, wherein the state of the output voltage comprises a first state corresponding to a first mode and a second state corresponding to a second mode for changing the supply current faster than the first mode, wherein the supply current is adjusted stepwise for each cycle, and wherein the adjusting the supply current comprises:

performing a step-back operation to re-output the supply current output at least one cycle ago based on the first state being detected while adjusting the supply current in the second mode based on the second state; and adjusting the supply current in the first mode.

16. The method of claim 15, wherein the load block comprises a core of a processor in a system-on-chip (SoC), and wherein the adjusting the supply current comprises controlling turn-on and turn-off operations of at least a portion of header cell switches corresponding to the core of the processor, among header cell switches in the SoC.

17. The method of claim 15, wherein the adjusting the supply current comprises adjusting the supply current in the second mode based on the second state being detected while adjusting the supply current in the first mode based on the first state.

18. The method of claim 15, wherein the adjusting the supply current in the first mode comprises performing a negative step operation in the first mode for a predetermined time, and wherein the negative step operation is adjusting the supply current in an opposite direction to a direction in which the supply current is adjusted in the second mode.

19. A system-on-chip (SoC) comprising:

a processing core;

a plurality of header cell switches configured to supply a driving voltage to the processing core; and a low-dropout (LDO) core configured to select a control mode based on a state of the driving voltage supplied to the processing core and to output a control code for controlling operations of the plurality of header cell switches based on the control mode for each cycle, wherein the plurality of header cell switches are configured to control an amount of supply current, supplied to the processing core, based on the control code to adjust the driving voltage, and wherein the LDO core is configured to perform a step-back operation to re-output a previous control code, output in a previous cycle, based on the state of the driving voltage corresponding to a slow mode being detected while operating in a fast mode for adjusting the driving voltage faster than in the slow mode.

20. The SoC of claim 19, wherein the LDO core is configured to perform the step-back operation and a negative step operation in the slow mode for a predetermined time based on the state of the driving voltage corresponding to the slow mode being detected while operating in the fast mode, and wherein the negative step operation is outputting an opposite control code changed in an opposite direction to a direction in which the control code, output while operating in the fast mode, is changed.

* * * * *